(12) United States Patent
Myers et al.

(10) Patent No.: US 7,841,306 B2
(45) Date of Patent: Nov. 30, 2010

(54) RECOVERING HEAT ENERGY

(75) Inventors: Scott R. Myers, La Mirada, CA (US); Robert Miller, Weeki Wachee, FL (US)

(73) Assignee: Calnetix Power Solutions, Inc., Stuart, FL (US)

( * ) Notice: Subject to any disclaimer, the term of this patent is extended or adjusted under 35 U.S.C. 154(b) by 696 days.

(21) Appl. No.: 11/735,849

(22) Filed: Apr. 16, 2007

(65) Prior Publication Data

US 2008/0252078 A1    Oct. 16, 2008

(51) Int. Cl.
F22D 7/00    (2006.01)
F01K 25/08    (2006.01)
F01K 23/06    (2006.01)

(52) U.S. Cl. .................... 122/406.5; 60/670; 60/651; 290/52

(58) Field of Classification Search .................. 290/52; 60/670, 673, 671, 651; 122/406.4, 406.5
See application file for complete search history.

(56) References Cited

U.S. PATENT DOCUMENTS

| | | | |
|---|---|---|---|
| 2,276,695 A | 3/1942 | Lavarello | |
| 2,409,857 A | 10/1946 | Hines et al. | |
| 2,465,761 A | 3/1949 | Staude | |
| 2,917,636 A | 12/1959 | Akeley | |
| 3,035,557 A * | 5/1962 | Litwinoff | 122/479.7 |
| 3,060,335 A | 10/1962 | Greenwald | |
| 3,064,942 A | 11/1962 | Martin | |
| 3,212,477 A * | 10/1965 | Hansruedi et al. | 122/406.4 |
| 3,376,857 A | 4/1968 | Smith | |
| 3,439,201 A | 4/1969 | Levy et al. | |
| 3,530,836 A * | 9/1970 | Caravatti | 122/406.5 |
| 3,943,443 A | 3/1976 | Kimura et al. | |
| 4,170,435 A | 10/1979 | Swearingen | |
| 4,260,914 A | 4/1981 | Hertrich | |
| 4,262,636 A * | 4/1981 | Augsburger | 122/406.5 |
| 4,341,151 A | 7/1982 | Sakamoto | |
| 4,358,697 A | 11/1982 | Liu et al. | |
| 4,362,020 A | 12/1982 | Meacher et al. | |

(Continued)

FOREIGN PATENT DOCUMENTS

EP    1905948    4/2008

(Continued)

OTHER PUBLICATIONS

PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.

(Continued)

Primary Examiner—Julio Gonzalez
(74) Attorney, Agent, or Firm—Fish & Richardson P.C.

(57) ABSTRACT

Some embodiments of a generator system can be used with the working fluid in a Rankine cycle. For example, the generator system can be used in a Rankine cycle to recover heat from one of a number of commercial applications and to convert that heat energy into electrical energy. In particular embodiments, the generator system may include a turbine generator apparatus to generate electrical energy and a liquid separator arranged upstream of the turbine generator apparatus.

23 Claims, 11 Drawing Sheets

U.S. PATENT DOCUMENTS

| | | | |
|---|---|---|---|
| 4,415,024 A | | 11/1983 | Baker |
| 4,472,355 A | * | 9/1984 | Hickam et al. ................. 422/62 |
| 4,544,855 A | | 10/1985 | Prenner et al. |
| 4,553,397 A | * | 11/1985 | Wilensky ..................... 60/649 |
| 4,635,712 A | | 1/1987 | Baker et al. |
| 4,659,969 A | | 4/1987 | Stupak |
| 4,738,111 A | * | 4/1988 | Edwards ...................... 60/671 |
| 4,740,711 A | * | 4/1988 | Sato et al. ..................... 290/52 |
| 5,003,211 A | | 3/1991 | Groom |
| 5,083,040 A | | 1/1992 | Whitford et al. |
| D325,080 S | | 3/1992 | Wortham |
| 5,107,682 A | * | 4/1992 | Cosby ......................... 60/650 |
| 5,241,425 A | | 8/1993 | Sakamoto et al. |
| 5,315,197 A | | 5/1994 | Meeks et al. |
| 5,481,145 A | | 1/1996 | Canders et al. |
| 5,514,924 A | | 5/1996 | McMullen et al. |
| 5,559,379 A | | 9/1996 | Voss |
| 5,627,420 A | | 5/1997 | Rinker et al. |
| 5,640,064 A | | 6/1997 | Boyd, Jr. et al. |
| 5,668,429 A | | 9/1997 | Boyd, Jr. et al. |
| 5,672,047 A | | 9/1997 | Birkholz |
| 5,852,338 A | | 12/1998 | Boyd, Jr. et al. |
| 5,894,182 A | | 4/1999 | Saban et al. |
| 5,911,453 A | | 6/1999 | Boyd, Jr. et al. |
| 5,942,829 A | | 8/1999 | Huynh |
| 5,990,588 A | | 11/1999 | Kliman et al. |
| 5,994,804 A | | 11/1999 | Grennan et al. |
| 6,002,191 A | | 12/1999 | Saban |
| 6,018,207 A | | 1/2000 | Saban et al. |
| 6,087,744 A | | 7/2000 | Giauning |
| 6,088,905 A | | 7/2000 | Boyd, Jr. et al. |
| 6,130,494 A | | 10/2000 | Schöb |
| 6,148,967 A | | 11/2000 | Huynh |
| 6,167,703 B1 | | 1/2001 | Rumez et al. |
| 6,191,511 B1 | | 2/2001 | Zysset |
| 6,223,417 B1 | | 5/2001 | Saban et al. |
| 6,250,258 B1 | | 6/2001 | Liebig |
| 6,270,309 B1 | | 8/2001 | Ghetzler et al. |
| 6,304,015 B1 | | 10/2001 | Filatov et al. |
| 6,324,494 B1 | | 11/2001 | Saban |
| 6,325,142 B1 | | 12/2001 | Bosley et al. |
| 6,343,570 B1 | * | 2/2002 | Schmid et al. ............... 122/7 R |
| 6,388,356 B1 | | 5/2002 | Saban |
| D459,796 S | | 7/2002 | Moreno |
| 6,437,468 B2 | | 8/2002 | Stahl et al. |
| 6,465,924 B1 | | 10/2002 | Maejima |
| 6,504,337 B1 | | 1/2003 | Saban et al. |
| 6,663,347 B2 | | 12/2003 | Decker et al. |
| 6,664,680 B1 | | 12/2003 | Gabrys |
| 6,700,258 B2 | | 3/2004 | McMullen et al. |
| 6,727,617 B2 | | 4/2004 | McMullen et al. |
| 6,777,847 B1 | | 8/2004 | Saban et al. |
| 6,794,780 B2 | | 9/2004 | Silber et al. |
| 6,856,062 B2 | | 2/2005 | Heiberger et al. |
| 6,876,194 B2 | | 4/2005 | Lin et al. |
| 6,897,587 B1 | | 5/2005 | McMullen et al. |
| 6,934,666 B2 | | 8/2005 | Saban et al. |
| 6,967,461 B1 | | 11/2005 | Markunas et al. |
| 7,019,412 B2 | | 3/2006 | Ruggieri et al. |
| 7,042,118 B2 | | 5/2006 | McMullen et al. |
| 7,075,399 B2 | | 7/2006 | Saban et al. |
| 7,208,854 B1 | | 4/2007 | Saban et al. |
| 2003/0074165 A1 | | 4/2003 | Saban et al. |
| 2004/0027011 A1 | | 2/2004 | Bostwick et al. |
| 2004/0189429 A1 | | 9/2004 | Saban et al. |
| 2005/0093391 A1 | | 5/2005 | McMullen et al. |
| 2005/0262848 A1 | * | 12/2005 | Joshi et al. ................... 60/772 |
| 2007/0018516 A1 | | 1/2007 | Pal et al. |
| 2007/0056285 A1 | | 3/2007 | Brewington |
| 2007/0063594 A1 | | 3/2007 | Huynh |
| 2007/0200438 A1 | | 8/2007 | Kaminski et al. |
| 2008/0103632 A1 | | 5/2008 | Saban et al. |
| 2008/0224551 A1 | | 9/2008 | Saban et al. |
| 2008/0246373 A1 | | 10/2008 | Filatov |
| 2008/0250789 A1 | | 10/2008 | Myers et al. |
| 2008/0252077 A1 | | 10/2008 | Myers |
| 2009/0004032 A1 | | 1/2009 | Kaupert |
| 2009/0126371 A1 | * | 5/2009 | Powell et al. .................... 62/6 |

FOREIGN PATENT DOCUMENTS

| | | |
|---|---|---|
| GB | 2225813 | 6/1990 |
| JP | 63129839 | 6/1988 |
| JP | 63277443 | 11/1988 |
| JP | 2001078390 | 3/2001 |
| WO | WO 03/100946 A1 | 12/2003 |

OTHER PUBLICATIONS

Ormat Web Site: "Recovered Energy Generation in the Cement Industry," (2 pages) available at http://www.ormat.com/technology_cement_2.htm, printed Jul. 26, 2006.

Turboden—Organic Rankine Cycle, "Turboden High Efficiency Rankine for Renewable Energy and Heat Recovery," (2 pages), available at http://www.turboden.it/orc.asp, 1999-2003. printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Freepower ORC Electricity Company Home Page, "Welcome to Freepower," (1 page) available at http://www.freepower.co.uk/, Jul. 18, 2006.

Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.

Freepower ORC Electricity Company with Industrial Processes, "Industrial Processes," (1 page), available at http://www.freepower.co.uk/site-5.htm, 2000-2006, printed Jul. 26, 2006.

Freepower ORC Electricity Company FP6 Product Description, "FP6," (1 page), available at http://www.freepower.co.uk/fp6.htm, 2000-2006, printed Jul. 26, 2006.

Freepower ORC Electricity Company FP120 Product Description, "FP120," (1 page), available at http://www.freepower.co.uk/fp120.htm, 2000-2006, printed Jul. 26, 2006.

Freepower ORC Electricity Company FP60 Product Description, "FP60," (1 page), available at http://www.freepower.co.uk/fp60.htm, 2000-2006, printed Jul. 26, 2006.

Freepower ORC Electricity Company Products Overview "A System Overview," (1 page), available at http://www.freepower.co.uk/tech-overview.htm, 2000-2006, printed Jul. 26, 2006.

Freepower FP6,. "Freepower FP6 Specification & Dimensions for 6kWe Electricity Generating Equipment," (2 pages), 2000-2004, printed Jul. 26, 2006.

Honeywell, "Genetron® 245fa Applications Development Guide," (15 pages), 2000.

International Search Report and Written Opinion of the International Searching Authority issued in corresponding International Application No. PCT/US2008/060227 on Oct. 28, 2008; 12 pages.

International Search Report and Written Opinion of the International Searching Authority issued in International Application No. PCT/US2008/057082 on Jul. 8, 2008, 12 pages.

International Preliminary Report on Patentability issued in International Application No. PCT/US2008/057082 on Mar. 16, 2009; 11 pages.

International Preliminary Report on Patentability issued in International Application No. PCT/US2008/060227; Jun. 17, 2009; 11 pages.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Hawkins, Lawrence A. et al., "*Analysis and Testing of a Magnetic Bearing Energy Storage Flywheel with Gain-Scheduled, Mimo Control*," Proceedings of ASME Turboexpo 2000, Munich, Germany, May 8-11, 2000, pp. 1-8.

McMullen, Patrick T. et al., "*Combination Radial-Axial Magnetic Bearing*," Seventh International Symposium on Magnetic Bearings, ETH Zurich, Aug. 23-25, 2000, pp. 473-478.

Hawkins, Lawrence et al., "*Shock and Vibration Testing of an AMB Supported Energy Storage Flywheel*," 8$^{th}$ International Symposium on Magnetic Bearings, Mito, Japan, Aug. 26-28, 2002, 6 pages.

McMullen, Patrick T. et al., "*Design and Development of a 100 KW Energy Storage Flywheel for UPS and Power Conditioning Applications*," 24$^{th}$ International PCIM Conference, Nuremberg, Germany, May 20-22, 2003, 6 pages.

Hawkins, Larry et al., "*Development of an AMB Energy Storage Flywheel for Industrial Applications*," 7$^{th}$ International Symposium on Magnetic Suspension Technology, Fukoka, Japan, Oct. 2003, 7 pages.

Hawkins, Larry et al., "*Development of an AMB Energy Storage Flywheel for Commercial Application*," International Symposium on Magnetic Suspension Technology, Dresden, Germany, Sep. 2005, 5 pages.

Huynh, Co et al., "*Flywheel Energy Storage System for Naval Applications*," GT 2006-90270, Proceedings of GT 2006 ASME Turbo Expo 2006: Power for Land, Sea & Air, Barcelona, Spain, May 8-11, 2006, pp. 1-9.

McMullen, Patrick et al., "*Flywheel Energy Storage System with AMB's and Hybrid Backup Bearings*," Tenth International Symposium on Magnetic Bearings, Martigny, Switzerland, Aug. 21-23, 2006, 6 pages.

United States Patent Office's prosecution file for U.S. Appl. No. 11/524,690, 192 pages, Sep. 21, 2006.

United States Patent Office's prosecution file for U.S. Appl. No. 12/049,117, 148 pages, Mar. 14, 2008.

United States Patent Office's prosecution file for U.S. Appl. No. 11/735,854; 115 pages, Apr. 16, 2007.

* cited by examiner

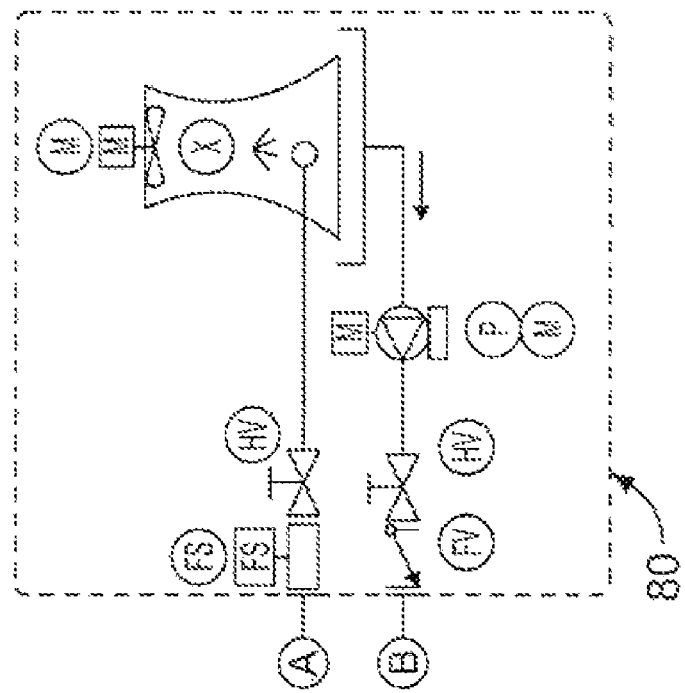

FIG. 7B

| LEGEND | |
|---|---|
| TAG NO. | DESCRIPTION |
| CV | CONTROL VALVE |
| FS | FLOW SWITCH |
| FV | FLOW VALVE |
| HV | HAND VALVE |
| LG | LEVEL GAUGE |
| LS | LEVEL SWITCH |
| LV | LEVEL VALVE |
| M | MOTOR |
| P | PUMP |
| PI | PRESSURE INDICATOR |
| PRV | PRESSURE RELIEF VALVE |
| PT | PRESSURE TRANSMITTER |
| SV | SOLENOID VALVE |
| TI | TEMPERATURE INDICATOR |
| TT | TEMPERATURE TRANSMITTER |
| TW | THERMOWELL |
| VP | VALVE POSITIONER |
| X | VARIOUS SYSTEM COMPONENTS |
| YS | WYE STRAINER |

RECOVERING HEAT ENERGY

TECHNICAL FIELD

This document relates to the operation of a fluid expansion system, including some systems that comprise a turbine apparatus to generate energy from gaseous fluid expansion.

BACKGROUND

A number of industrial processes create heat as a byproduct. In some circumstances, this heat energy is considered "waste" heat that is dissipated to the environment in an effort to maintain the operating temperatures of the industrial process equipment. Exhausting or otherwise dissipating this "waste" heat generally hinders the recovery of this heat energy for conversion into other useful forms of energy, such as electrical energy.

Some turbine generator systems have been used to generate electrical energy from the rotational kinetic energy a turbine wheel. For example, the rotation of the turbine wheel can be used to rotate a permanent magnet within a stator, which then generates electrical energy. Such turbine generator systems use a compressed gas that is expanded during the flow over the turbine wheel, thereby causing the turbine wheel to rotate. In some circumstances, the fluid flowing toward the turbine wheel can include "slugs" of liquid state fluid intermixed with the gaseous state fluid. The presence of liquid slugs in the working fluid can reduce the efficiency of the turbine system.

SUMMARY

Some embodiments of a generator system can be used in a Rankine cycle to recover heat from one of a number of commercial applications and to convert that heat energy into useable electrical energy. For example, the Rankine cycle may employ a working fluid that recovers heat from a commercial compressor interstage cooler or a commercial exhaust oxidizer. The heated and pressurized working fluid can then be directed to the generator system for generation of usable electrical energy. In particular embodiments, the generator system may include a turbine generator apparatus to generate electrical energy and a liquid separator arranged upstream of the turbine generator apparatus. In such circumstances, the liquid separator can receive the heated and pressurized working fluid so as to separate a substantial portion of the liquid state droplets or slugs of working fluid from the gaseous state working fluid. The gaseous state working fluid can be passed to the turbine generator apparatus with the substantial portion of liquid state droplets or slugs removed, thereby protecting the turbine generator apparatus from damage caused by such liquid state working fluid.

In some embodiments, a method of using a turbine generator system may include pumping a working fluid in a Rankine cycle from a low pressure reservoir toward at least one commercial compressor interstage cooler. The method may also include heating the working fluid from the heat energy recovered from one or more compression stages of the commercial compressor interstage cooler. At least a portion of the working fluid may be pressurized and heated to a gaseous state. The method may further include directing the heated and pressurized working fluid toward a turbine generator apparatus. The turbine generator apparatus may include an inlet conduit to direct the working fluid toward a turbine wheel that is rotatable in response to expansion of the working fluid. The method may also include generating electrical energy from the rotation of the turbine wheel. The turbine wheel may be coupled to a rotor of an electrical energy generator that rotates within a stator of the electrical energy generator.

In some embodiments, a method using a turbine generator system may include pumping a working fluid in a Rankine cycle from a low pressure reservoir toward at least one commercial exhaust oxidizer. The method may also include heating the working fluid from the heat energy recovered from the commercial exhaust oxidizer. At least a portion of the working fluid may be pressurized and heated to a gaseous state. The method may further include directing the heated and pressurized working fluid toward a turbine generator apparatus. The turbine generator apparatus may include an inlet conduit to direct the working fluid toward a turbine wheel that is rotatable in response to expansion of the working fluid. The method may also include generating electrical energy from the rotation of the turbine wheel. The turbine wheel may be coupled to a rotor of an electrical energy generator that rotates within a stator of the electrical energy generator.

These and other embodiments described herein may provide one or more of the following advantages. First, some embodiments of a fluid expansion system may include a liquid separator arranged upstream of a turbine generator apparatus. The liquid separator may be configured to separate and remove a substantial portion of any liquid state droplets (or slugs) of working fluid that might otherwise pass into the turbine generator apparatus 100. Because a substantial portion of any liquid-state droplets or slugs are removed by the liquid separator, the turbine generator apparatus may be protected from erosion or damage caused by such liquid state working fluid.

Second, the fluid expansion system may be equipped with a dual control valve system that provides flow control during transient flow conditions, protection for the turbine generator apparatus, and efficient power output from the turbine generator apparatus. In some cases, first and second control valves may be mechanically coupled to one another so as to operate in unison, for example, by activation of a single actuator device.

Third, the fluid expansion system can be used to recover waste heat from industrial applications and then to convert the recovered waste heat into electrical energy. The heat energy can be recovered from an industrial application in which heat is a byproduct, such as commercial exhaust oxidizers (e.g., a fan-induced draft heat source bypass system, a boiler system, or the like), refinery systems that produce heat, foundry systems, smelter systems, landfill flare gas and generator exhaust, commercial compressor systems, food bakeries, and food or beverage production systems. Furthermore, the heat energy can be recovered from geo-thermal heat sources and solar heat sources.

Fourth, some embodiments of the turbine generator apparatus may be arranged so that the fluid outflow to the outlet side of the turbine wheel is directed generally toward the rotor, the stator, or both (e.g., toward a permanent magnet, toward generator components disposed around the permanent magnet, or both). Such a configuration permits the fluid to provide heat dissipation to some components of an electrical generator device.

Fifth, some embodiments of the turbine generator apparatus may include a turbine wheel that is coupled to bearing supports on both the input side and the outlet side of the turbine wheel, which provides a configuration favorable to rotordynamics operation and lubrication. For example, one bearing support may be located adjacent to the input face of the turbine wheel, and a second bearing support may be located on the outlet side but axially spaced apart from the wheel outlet (e.g., not immediately adjacent to the turbine wheel outlet). Accordingly, the turbine wheel can be supported in a non-cantilevered manner with bearing supports on both the input side and the outlet side of the turbine wheel. Also, the turbine generator apparatus may be configured to provide service access to the bearing supports without necessarily removing the turbine wheel or the rotor from the turbine generator casing.

Sixth, some embodiments of the turbine apparatus may include at least two seals on opposing sides of the turbine wheel (e.g., at least one seal on the input side and at least one seal on the outlet side). These seals may be part of subsystem that provides a thrust balance effect to the turbine wheel during operation. In such circumstances, the thrust balance provided by the subsystem can permit significant pressure ratio implementations across the turbine wheel.

Seventh, some embodiments of the turbine generator apparatus can reduce the likelihood of leakage to or from the external environment. For example, if a portion of the working fluid diverges from the flow path and seeps past the seal around the turbine wheel, the leaked fluid may merely reenter the fluid flow path (rather than leaking outside of the fluid flow path and into the environment).

Eighth, some embodiments of the turbine generator apparatus can be used in a Rankine Cycle, such as an organic Rankine Cycle, to generate kinetic energy from fluid expansion. Such kinetic energy can be used, for example, to generate electrical power. Other embodiments of the turbine generator apparatus may be configured for use in other fluid expansion operations, for example, a Carnot cycle, a gas letdown system, a cryogenic expander system, or a process expansion system.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 7A-B is a diagram of a fluid expansion system used in a Rankine cycle in accordance with some embodiments.

Like reference symbols in the various drawings indicate like elements.

DETAILED DESCRIPTION OF ILLUSTRATIVE EMBODIMENTS

Referring to FIGS. 1-4, a fluid expansion system 10 may include a number of components that act upon a working fluid so as to generate kinetic energy from the expansion of the working fluid. In some embodiments, the fluid expansion system 10 can be part of a closed system, such as a Rankine Cycle or the like, in which the pressurized and heated working fluid is permitted to expand and release energy in a turbine generator apparatus 100 (described below in connection with FIGS. 8-10). Such kinetic energy can then be converted, for example, to electrical energy that is supplied to a power electronics system or to an electrically powered machine. For example, the heated and pressurized working fluid may enter the turbine generator apparatus 100 through an inlet conduit 105 and thereafter expand as the fluid flows over a rotatable turbine wheel. Electrical energy can be generated from the rotation of the turbine wheel and then output from the fluid expansion system 10. As described in more detail below, the fluid expansion system 10 can include a liquid separator 40 arranged upstream of the turbine generator apparatus 100. The liquid separator 40 may be configured to separate and remove a substantial portion of any liquid state droplets (or slugs) of working fluid that might otherwise pass into the turbine generator apparatus 100.

Figure 2:
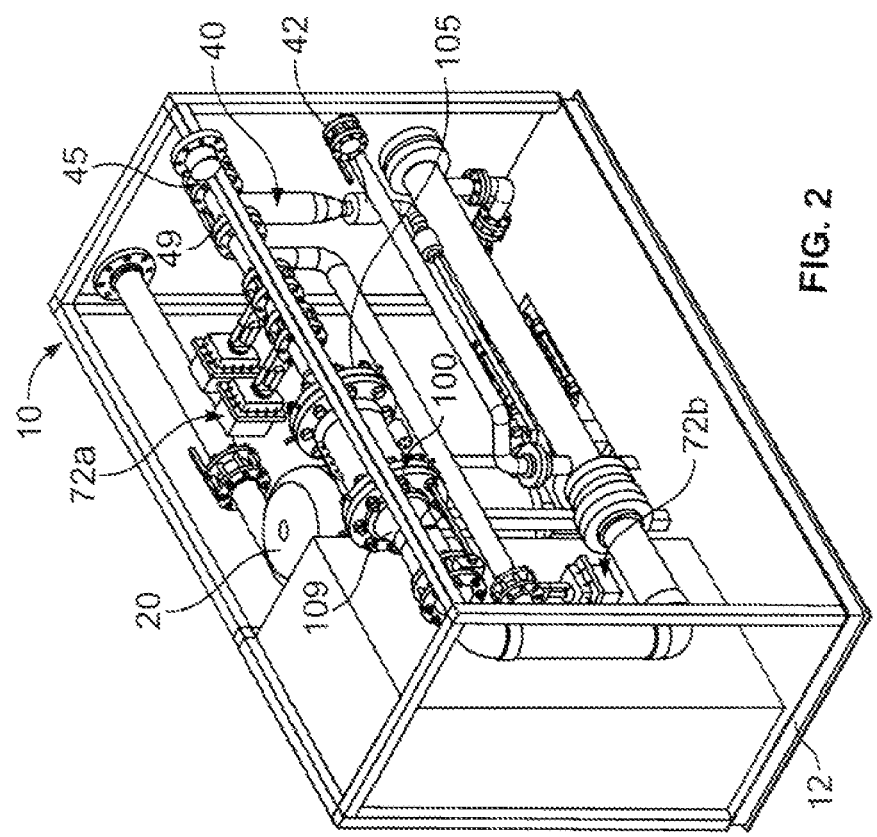
FIG. 2 is another perspective view of the fluid expansion system of FIG. 1.
Figure 1:
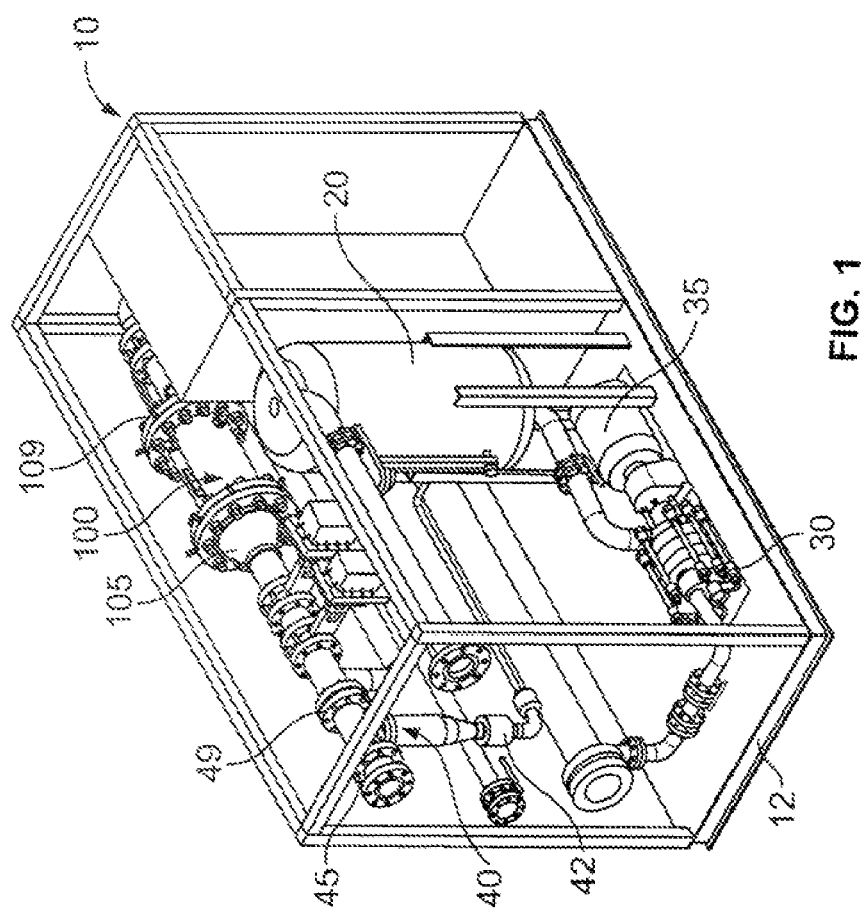
FIG. 1 is a perspective view of a fluid expansion system, in accordance with some embodiments.
Figure 4:
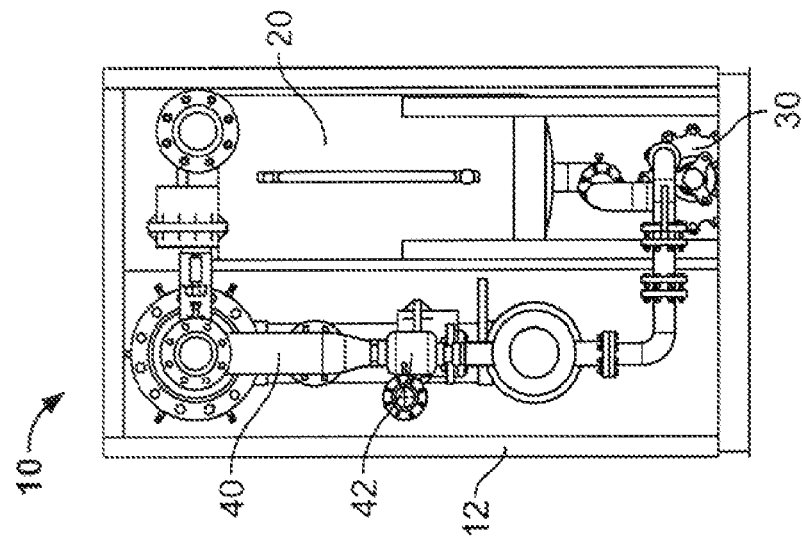
FIG. 4 is a rear view of the fluid expansion system of FIG. 1.

Some embodiments of the fluid expansion system 10 include a reservoir 20 that contains at least a portion of the working fluid in an expanded and cooled condition. For example, the working fluid disposed in the reservoir 20 may be in a liquid state after passing through a cooling stage of a Rankine cycle or the like. The reservoir 20 has an internal volume that is accessed by a number of ports for the flow of working fluid into and out of the reservoir 20. In this embodiment, the reservoir 20 is mounted to the package housing 12 of the system 10 so that the reservoir 20 can be transported contemporaneously with the turbine generator apparatus 100. As shown in FIG. 1, the reservoir 20 may comprise a vertically oriented tank. In some circumstances, the vertically oriented tank can be more space efficient. Also, the vertically oriented tank can be used to increase the amount of liquid state working fluid that is arranged over the drain port of the reservoir 20. In other embodiments, the reservoir may comprise a fluid container vessel having a different configuration, such as a horizontally oriented tank that may be used, for example, to reduce the overall height of the package housing 12.

It should be understood that the package housing 12 depicted in FIGS. 1-4 may include outer panels that enclosed the components therein. Examples of such outer panels on the package housing 12 are shown and described in connection with FIGS. 5-6. The outer panels are hidden from view in FIGS. 1-4 to show the components of the fluid expansion system 10.

Still referring to FIGS. 1-4, the fluid expansion system 10 may include a pump device 30 that is in fluid communication with the reservoir 20. The pump device 30 may be used to pressurize the working fluid and to direct the working fluid toward a heat source (described in more detail below). In this embodiment, the pump device 30 is mounted to the package housing 12 of the system 10 and is arranged below the reservoir 20 so that the working fluid is gravity fed toward the pump device 30. The pump device 30 may include a motor 35 that provides operational power to the pump device. In these circumstances, rotation of the motor 35 drives the pump device 30 to force the working fluid toward the down stream components. As described in more detail below in connection with FIGS. 7A-B, the pump device 30 may direct the working fluid to flow toward a heat source 60, thereby causing the working fluid to be pressurized and heated. The heat source 60 may be arranged outside of the package housing 12 of the fluid expansion system 10. In such circumstances, the working fluid may return to the fluid expansion system 10 via a conduit that is connected to an inlet flow port (refer, for example, to the input port adjacent the liquid separator 40 as shown in FIGS. 1-4).

Some embodiments of the fluid expansion system 10 also include a liquid separator 40 arranged upstream of the turbine generator apparatus 100. As previously described, the turbine generator apparatus 100 receives the heated and pressurized working fluid so as to generate kinetic energy from the expansion of the working fluid therein. The turbine generator apparatus 100 may be configured to operate when the heated and pressurized working fluid is in a gaseous state. In such circumstances, the likelihood of erosion or other damage to the turbine generator apparatus 100 may be increased when a portion of the working fluid includes droplets or "slugs" of fluid in a liquid state. Also, the efficiency of the turbine generator apparatus 100 may be decreased when a portion of the working fluid includes droplets or slugs in a liquid state. Accordingly, the liquid separator 40 may be arranged upstream of the turbine generator apparatus so as to separate and remove a substantial portion of liquid state droplets or slugs of working fluid that might otherwise pass into the turbine generator apparatus 100.

The liquid separator 40 may be in the form of a cyclone separator device, a coalescing membrane device, or the like. In the embodiment depicted in FIGS. 1-4, the liquid separator 40 comprises a cyclone separator device that mechanically spins the working fluid to thereby centrifugally separate some or all of the liquid state droplets of working fluid. For example, the liquid separator 40 may comprise a cyclone separator device manufactured by R.P. Adams Company, Inc. of Tonawanda, N.Y.

The liquid separator may include a secondary reservoir 42 to which the separated liquid-state droplets or slugs or working fluid are directed. The secondary reservoir 42 may be arranged below main body of the liquid separator 40 so that the separated liquid-state fluid can be gravity fed toward the secondary reservoir 42. The secondary reservoir 42 may be in fluid communication with the previously described reservoir 20, thereby permitting the separated liquid-state droplets to return to the working fluid contained in the reservoir 20. Accordingly, the liquid separator 40 can be arranged upstream of the turbine generator apparatus 100 in a manner such that the gaseous state working fluid can be passed to the turbine generator apparatus 100 while a substantial portion of any liquid-state droplets or slugs are removed and returned to the reservoir 20.

Still referring to FIGS. 1-4, in some embodiments, the liquid separator 40 may be arranged upstream of the turbine generator apparatus 100 such that the liquid separator 40 is in direct fluid communication with the turbine generator apparatus 100. In these circumstances, the heated and pressurized working fluid may be received by the separator inlet 45, and the liquid separator 40 can act to remove a substantial portion of any liquid-state droplets or slugs of working fluid (as previously described). The separator outlet 49 may be in direct fluid communication with the inlet 105 conduit of the turbine generator apparatus 100. Accordingly, in this embodiment, at least the gaseous state portion of the heated and pressurized working fluid is passed directly from the separator outlet 45 to the inlet conduit 105 of the turbine generator apparatus 100. Because a substantial portion of any liquid-state droplets or slugs are removed by the liquid separator 40, the turbine generator apparatus 100 may be protected from damage caused by such liquid state working fluid.

Furthermore, in these embodiments, the liquid separator 40 can serve as a reservoir volume to improve the system stability during transient conditions. For example, if the flow of the working fluid is initiated toward the turbine generator apparatus 100 before the working fluid has been sufficiently heated and pressurized, a random burst of liquid-state fluid flow may pass towards the turbine generator apparatus 100. The liquid separator 40 can serve as an accumulator device that protects the turbine generator apparatus 100 from such a burst of liquid-state fluid flow. Thus, in addition to reducing the likelihood of erosion damage to the turbine generator apparatus 100, the liquid separator 40 may improve the system stability during transient conditions.

Figure 3:
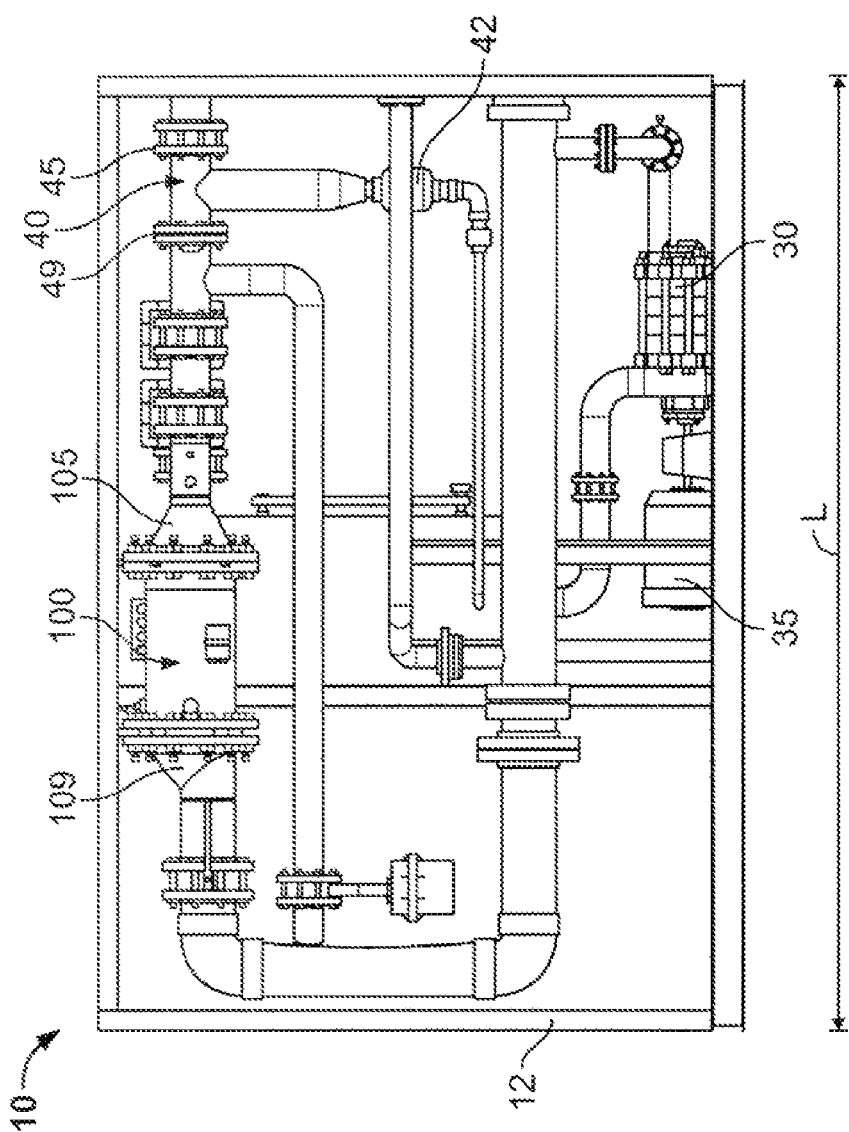
FIG. 3 is a side view of the fluid expansion system of FIG. 1.

Still referring to FIGS. 1-4, the heated and pressurized working fluid may enter the turbine generator apparatus 100 through the inlet conduit 105 and thereafter expand as the fluid flows over a rotatable turbine wheel (described below, for example, in connection with FIGS. 8-10). In this embodiment, the rotation of the turbine wheel in the turbine generator apparatus 100 is used to generate electrical energy that is then output from the fluid expansion system 10. As shown in FIG. 3, the working fluid may exit the turbine generator apparatus 100 through an outlet conduit 109. In some embodiments, the expanded working fluid that exits the turbine generator apparatus 100 may be directed to a cooling source. For example, in those embodiments in which the fluid expansion system is part of a Rankine cycle, the expanded working fluid may be directed to a condenser. Thereafter, the cooled and expanded working fluid may be directed through a conduit to return to the reservoir 20 (refer, for example, in FIG. 1). When the fluid expansion system 10 is part of a closed loop Rankine cycle, as described in more detail below, some embodiments of the turbine generator apparatus 100 may serve as a single stage turbine expander with variable speed capability.

Figure 5:
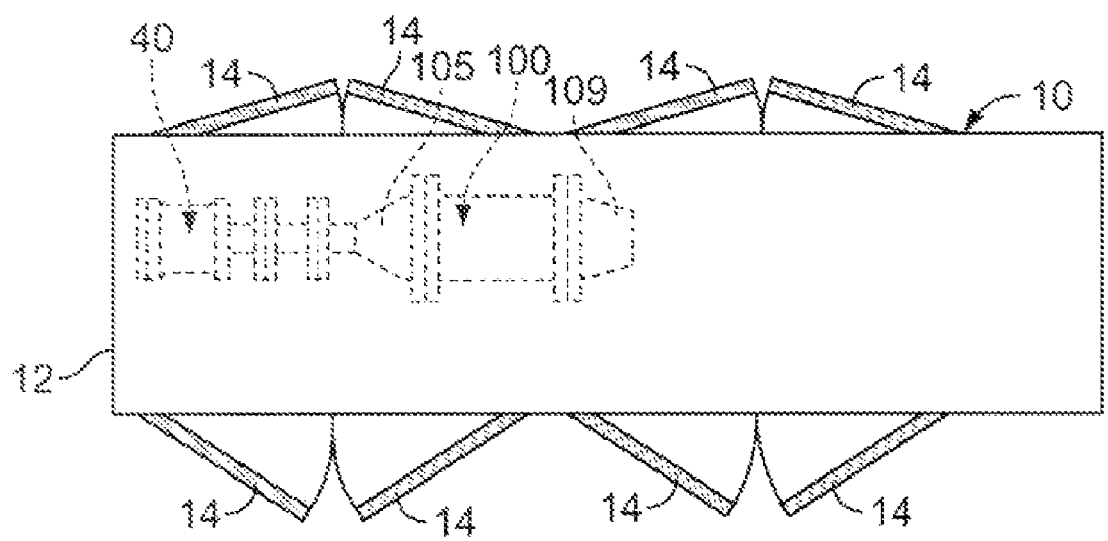
FIG. 5 is a top view of the fluid expansion system of FIG. 1.
Figure 6:
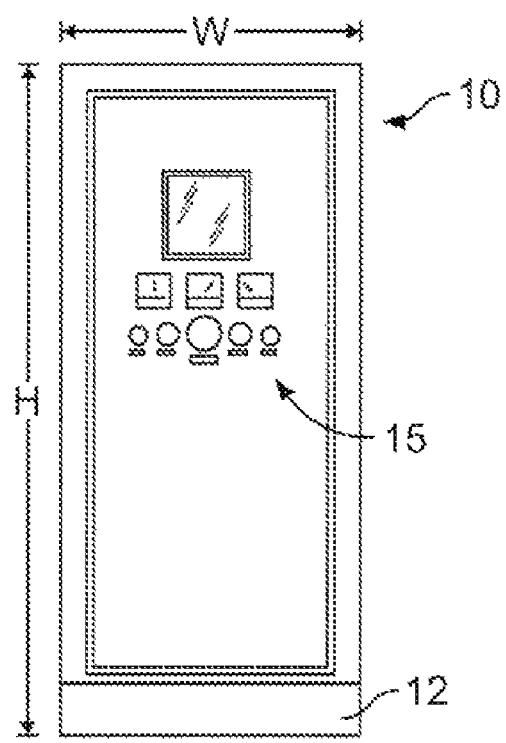
FIG. 6 is a front view of the fluid expansion system of FIG. 1

Referring now to FIGS. 5-6, the fluid expansion system 10 can be constructed so that a user can readily access a number of the system components. For example, as shown in FIG. 5, the package housing 12 of the fluid expansion system 10 may include a number of access panels 14 that can be opened by a user to access the reservoir 20, the pump device 30, the liquid separator 40, the turbine apparatus 100, and other components. Accordingly, in some circumstances, the inspection and maintenance of the fluid expansion system 10 can be performed with substantial disassembly. In addition, the fluid expansion system 10 may include a control interface 15 (refer, for example, to FIG. 6) that provides the user with information on the performance and settings of the fluid expansion system. In some embodiments, the control interface may include a display screen, a number of indicator meters, or a combination thereof so that a user can monitor the operation of the fluid expansion system 10 and (in some circumstances) adjust any settings or parameters of the system.

Furthermore, the fluid expansion system 10 can be constructed in a manner that provides simplified transportation to the desired installation location. For example, the package housing 12 for the fluid expansion system may have overall dimensions that permit transport through a standard double-door passage. In some embodiments, the package housing 12 of the fluid expansion system 10 may have a width W (refer, for example, to FIG. 6) that is less than about 72 inches, less than about 50 inches, and preferably about 48 inches or less.

Also, in some embodiments, the package housing 12 of the fluid expansion system 10 may have a height H (refer, for example, to FIG. 6) that is less than about 80 inches and preferably about 78 inches or less. As such, the fluid expansion system 10 can be readily transported through a standard double-door passage to a desired installation location even if that location is accessible only through a standard double-door passage (having a size of about 72 inches by about 80 inches). Optionally, the fluid expansion system 10 can be readily partially disassembled for transport through a standard single-door passage (e.g., having a width of about 36 inches). It should be understood from the description herein that the length L (refer, for example, to FIG. 3) of the packaging housing 12 may be affected by a number of factors, such as the size of the turbine generator apparatus 100 and the size of the reservoir 20. In some embodiments, the package housing 12 may have a length L of about 180 inches or less, about 48 inches to about 150 inches, about 60 inches to about 130 inches, and in this embodiment about 112 inches.

Figure 7A:
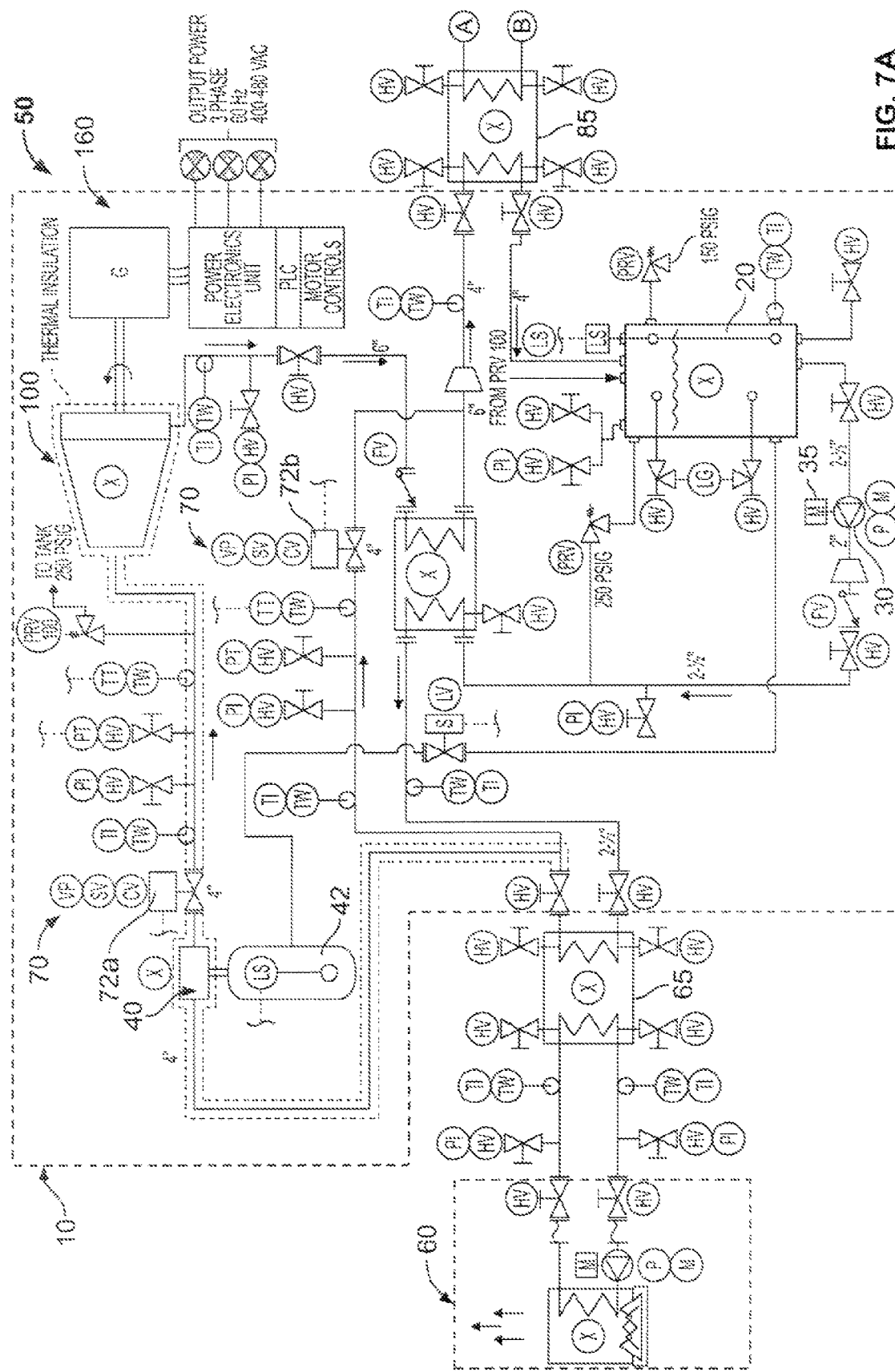

Referring now to FIGS. 7A-B, the fluid expansion system 10 may be part of a closed loop cycle 50, such as Rankine cycle, in which the heated and pressurized working fluid is expanded in the turbine generator apparatus 100. The Rankine cycle may comprise an organic Rankine cycle that employs an engineered working fluid. The working fluid in such a Rankine cycle may comprise a high molecular mass organic fluid that is selected to efficiently receive heat from relatively low temperature heat sources. In particular circumstances, the turbine generator apparatus 100 can be used to convert heat energy from a heat source into kinetic energy, which is then converted into electrical energy. For example, in some embodiments, the turbine generator apparatus 100 may output electrical power in form of a 3-phase 60 Hz power signal at a voltage of about 400 VAC to about 480 VAC. Also, in some embodiments, the turbine generator apparatus 100 may be configured to provide an electrical power output of about 2 MW or less, about 50 kW to about 1 MW, and about 100 kW to about 300 kW, depending upon the heat source in the cycle and other such factors.

As shown in FIG. 7A, the reservoir 20 of the fluid expansion system 10 contains a portion of the working fluid for the closed loop cycle 50. In this embodiment, the working fluid disposed in the reservoir may be in a liquid state after being expanded and cooled. The pump device 30 is driven by the motor 35 so as to pressurize the working fluid to toward a heat source 60. The pressurized working fluid is passed through a conduit toward the heat source so as to recover heat from the heat source 60. In this embodiment, at least a portion of the heat energy from the heat source 60 is transferred to the working fluid using a heat exchanger 65. In other embodiments, the working fluid may flow directly to the heat source 60 rather than receiving the heat from the intermediate heat exchanger 65. The heat source 60 may comprise, for example, an industrial application in which heat is a byproduct. The heat source 60 may comprise an industrial application including, but not limited to, commercial exhaust oxidizers (e.g., a fan-induced draft heat source bypass system, a boiler system, or the like), refinery systems that produce heat, foundry systems, smelter systems, landfill flare gas and generator exhaust, commercial compressor systems, food bakeries, and food or beverage production systems. As such, the fluid expansion system 10 can be used to recover waste heat from industrial applications and then to convert the recovered waste heat into electrical energy. Furthermore, the heat energy can be recovered from geo-thermal heat sources and solar heat sources.

After the working fluid has received heat recovered from the heat source 60, the heated and pressurized working fluid returns to the fluid expansion system 10 and is directed toward the turbine generator apparatus 100. The liquid separator 40 is arranged upstream of the turbine generator apparatus 100, so the heat and pressurized working fluid passes through the liquid separator 40 before passing to the turbine generator apparatus 100. As previously described, the liquid separator 40 may be arranged upstream of the turbine generator apparatus so as to separate and remove a substantial portion of any liquid state droplets or slugs of working fluid that might otherwise pass into the turbine generator apparatus 100. In this embodiment, the liquid separator 40 includes a secondary reservoir 42 to which the separated liquid-state droplets or slugs or working fluid are directed. The secondary reservoir 42 may be in fluid communication with the previously described reservoir 20, thereby permitting the separated liquid-state droplets to return to the working fluid contained in the reservoir 20. Because a substantial portion of any liquid-state droplets or slugs are removed by the liquid separator 40, the turbine generator apparatus 100 may be protected from damage caused by such liquid state working fluid. In addition, the liquid separator 40 may improve the system stability during transient conditions (as previously described in connection with FIGS. 1-4).

Still referring to FIG. 7A, the gaseous state working fluid may enter the turbine generator apparatus 100 after exiting the liquid separator 40. The heat and pressurized working fluid can thereafter expand as the fluid flows over a rotatable turbine wheel (described below, for example, in connection with FIGS. 8-10). In this embodiment, the rotation of the turbine wheel in the turbine generator apparatus 100 is used to generate electrical energy that is then output from the fluid expansion system 10. For example, in some embodiments, the rotation of the turbine wheel causes rotation of a rotor carrying a magnet device 150 within an electric generator device 160 (refer, for example, to FIGS. 8-10). As described in more detail below, the electric generator device 160 may include electronic components used to configure and modify the electrical power generated. For example, in some embodiments, the turbine generator apparatus 100 may output electrical power in form of a 3-phase 60 Hz power signal at a voltage of about 400 VAC to about 480 VAC. The electrical components of the generator device 160 can regulate the electrical power output, thereby permitting the turbine generator apparatus 100 to serves as a single stage turbine expander with variable speed capability.

Referring to FIGS. 7A-B, the expanded working fluid that exits the turbine generator apparatus 100 (FIG. 7A) may be directed toward a cooling source 80 (FIG. 7B). In this embodiment, the expanded working fluid is passed through a conduit toward the cooling source 80 so as to condense working fluid into a liquid state. Also in this embodiment, the cooling source 80 includes a condenser 85 that removes excess heat from the working fluid. In other embodiments, the working fluid may flow directly to the cooling source 80 (e.g., a cooling tower, a forced-air radiator system, or the like) rather than removing the heat from the working fluid using the condenser 85. Thereafter, the cooled and expanded working fluid may be directed through a conduit to return to the reservoir 20 (FIG. 7A).

Still referring to FIGS. 7A-B, the fluid expansion system 10 may be equipped with a dual control valve system 70 that provides flow control during transient flow conditions, protection for the turbine generator apparatus 100, and efficient power output from the turbine generator apparatus 100. In this embodiment, the dual control valve system 70 includes a first valve 72*a* that operates as a through-flow valve to the turbine generator apparatus 100 and a second valve 72*b* that operates as a bypass valve. The first and second valves 72*a-b* can be actuated so that one is fully open while another is fully closed. For example, when the system 10 is started so that the working fluid is initially being heated by the heat source 60, the second valve 72*b* (e.g., the bypass valve) may be fully opened while the first valve 72*a* may be fully closed. As such, the turbine generator apparatus 100 is not exposed to the working fluid that is not fully heated to the desired temperature (e.g., some of which may still be in a liquid state), but the working fluid is permitted to cycle through the bypass valve 72*b* for repeated heating cycles (e.g., the condenser 85 may be set to remove little or not heat from the working fluid during this "cooking up" process). Continuing with this example, when the working fluid is thoroughly heated to the desired temperature, the first valve 72*a* may be set to fully open while the second valve is fully closed. In these circumstances, the bypass valve 72*b* is closed and the heated and pressurized working fluid pass to the turbine generator apparatus 100 as previously described.

In some embodiments, the first and second valves 72*a-b* of the dual control valve system 70 may operate in unison so as to provide protection for the turbine generator apparatus during transient flow conditions and to provide efficient power output from the turbine generator apparatus 100. In this embodiment, the first valve 72*a* is linked to the second valve 72*b* so that actuation of one valve results in actuation of the other. For example, the first valve 72*a* and second valve 72*b* may be coupled to the same actuator device (e.g., a servo actuator, a hydraulic actuator, a pneumatic actuator, a hand-operated lever, or the like) so that a user can signal the actuator device to adjust the two valves 72*a-b* in unison. In another example, the first valve 72*a* may have a first actuator and the second valve 72 *b* may have a second actuator, both of which operate in response to control signals from the same controller device. In some embodiments, one or both of the first and second valves 72*a-b* may comprise actuator-controlled butterfly valves that control the flow path of the working fluid (as depicted, for example, in FIG. 2).

Referring now to some embodiments of the turbine generator apparatus 100, the turbine generator apparatus 100 can generate kinetic energy from expansion of the working fluid. As previously described, the fluid expansion system can be part of a closed system, such as a Rankine Cycle or the like, in which a pressurized and heated working fluid is permitted to expand and release energy in the turbine generator apparatus 100.

Figure 8:
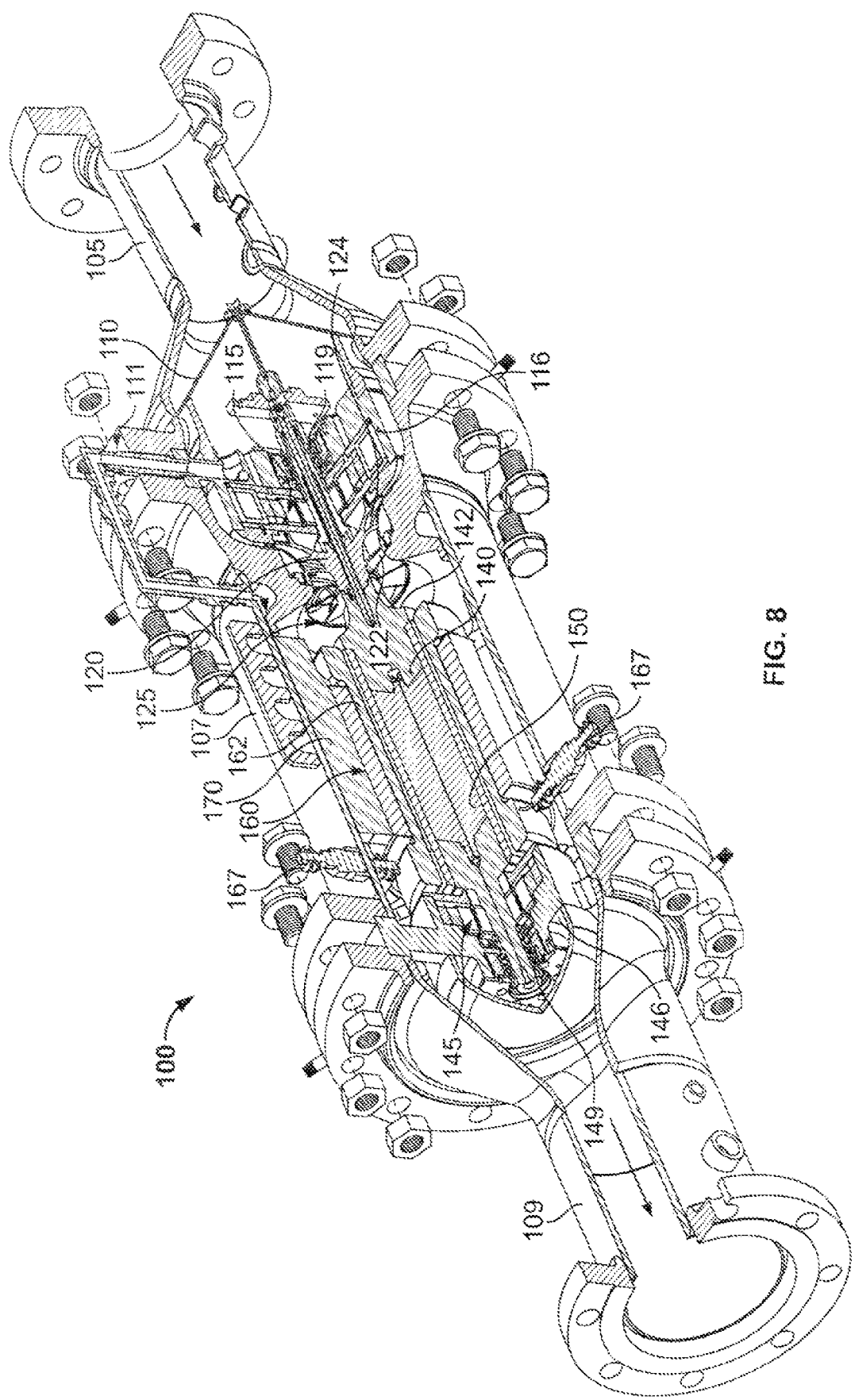
FIG. 8 is a quarter-sectional perspective view of a turbine generator apparatus in accordance with some embodiments.
Figure 9:
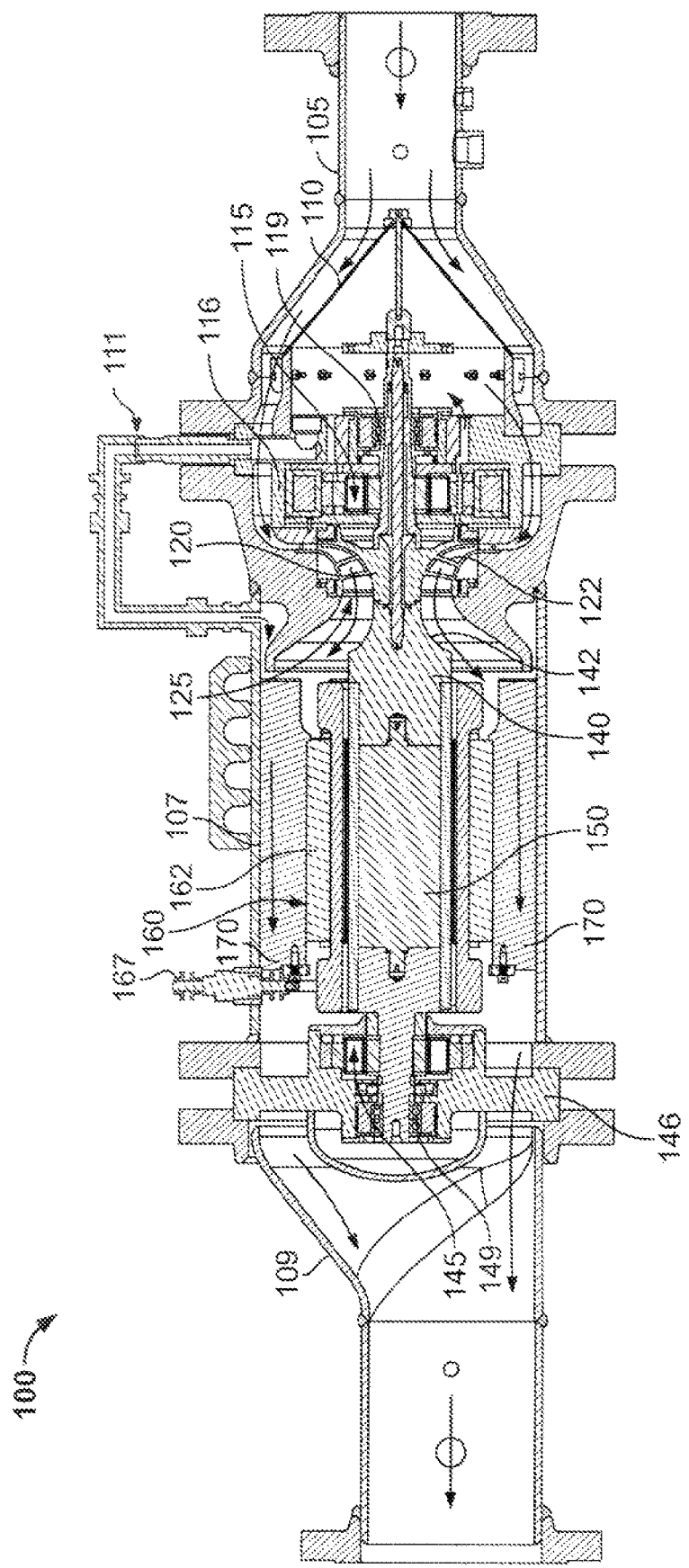
FIG. 9 is a cross-sectional view of the turbine generator apparatus of FIG. 8.

Referring to FIGS. 8-9, the heated and pressurized working fluid may enter the turbine generator apparatus 100 through an inlet conduit 105 and thereafter expand as the fluid flows over a rotatable turbine wheel 120. In this embodiment, the working fluid is then directed to an outlet side 125 (refer to FIG. 10) of the turbine wheel 120 so as to flow axially through a body casing 107 and toward an outlet conduit 109. The turbine wheel 120 can be configured to rotate as the working fluid expands and flows toward the outlet side 125 of the turbine wheel 120. In this embodiment, the turbine wheel 120 is a shrouded turbine wheel that includes a number of turbine blades 122 that translate the force from fluid acting against the blades 122 into the rotational motion of the turbine wheel 120. In other embodiments, the shroud can be omitted and/or different configurations of turbine wheels can be used. The working fluid can flow through the turbine wheel inlet 124 located proximate to an input side 126 (refer to FIG. 10) of the turbine wheel 120, act upon the turbine blades 122, and exit to the outlet side 125 of the turbine wheel. For example, in this embodiment, the outlet side 125 of the turbine wheel 120 includes the region extending from proximate the outlet face of the turbine wheel 120 and toward the outlet conduit 109.

In some embodiments, the turbine wheel 120 is shaft mounted and coupled to a rotor 140. The rotor 140 may include a magnet 150. As such, the turbine wheel 120 is driven to rotate by the expansion of the working fluid in the turbine generator apparatus 100, and the rotor 140 (including the magnet 150) rotate in response to the rotation of the turbine wheel 120. In certain embodiments, the turbine wheel 120 is directly coupled to the rotor 140, for example, by fasteners, rigid drive shaft, welding, or other manner. In certain embodiments, the turbine wheel 120 can be indirectly coupled to the rotor 140, for example, by a gear train, cutch mechanism, or other manner.

As shown in FIGS. 8-9, two bearing supports 115 and 145 are arranged to rotatably support the turbine wheel 120 relative to the body casing 107. In certain embodiments, one or more of the bearing supports 115 or 145 can include ball bearings, needle bearings, magnetic bearings, journal bearings, or other. For example, in this embodiment, the first and second bearing supports 115 and 145 comprise magnetic bearings having operability similar to those described in U.S. Pat. No. 6,727,617 assigned to Calnetix Inc. The disclosure of U.S. Pat. No. 6,727,617 describing the features and operation of magnetic bearing supports is incorporated by reference herein. The first bearing support 115 is mounted to a frame structure 116 on the input side 126 of the turbine wheel 120, and the second bearing support 145 is mounted to a second frame structure 146 on the outlet side 125 of the turbine wheel 120. In such circumstances, the turbine wheel 120 and the rotor 140 may be axially aligned and coupled to one another so as to collectively rotate about the axis of the bearing supports 115 and 145. Accordingly, both the turbine wheel 120 and the rotor 140 can be supported in a non-cantilevered manner by the first and second bearing supports 115 and 145.

In the embodiments in which the first and second bearing supports 115 and 145 comprise magnetic bearings, the turbine generator apparatus 100 may include one or more backup bearing supports. For example, the first and second bearing supports 115 and 145 may comprise magnetic bearings that operate with electrical power. In the event of a power outage that affects the operation of the magnetic bearing supports 115 and 145, first and second backup bearings 119 and 149 may be employed to rotatably support the turbine wheel 120 during that period of time. The first and second backup bearing supports 119 and 149 may comprise ball bearings, needle bearings, journal bearings, or the like. In this embodiment, the first backup bearing support 119 includes ball bearings that are arranged near the first magnetic bearing support 115. Also, the second backup bearing support 149 includes ball bearings that are arranged near the second magnetic bearing support 145. Thus, in this embodiment, even if the first and second bearing supports 115 and 149 temporarily fail (e.g., due to an electric power outage or other reason), the first and second backup bearing supports 119 and 149 would continue to support both the turbine wheel 120 and the rotor 140 in a non-cantilevered manner.

Still referring to FIGS. 8-9, some embodiments of the turbine generator apparatus 100 may be configured to generate electricity in response to the rotation of the driven member 150. For example, as previously described, the magnet 150 may comprise a permanent magnet that rotates within an electric generator device 160. The electric generator device 160 may include a stator 162 in which electrical current is generated by the rotation of the magnet 150 therein. For example, the stator 162 may include a plurality of a conductive coils used in the generation of electrical current. The stator 162 and other components of the electric generator device 160 may produce heat as a byproduct during the generation of electrical current. As described in more detail below, at least some of the heat byproduct can be dissipated by flow of the working fluid exiting to the outlet side 125 of the turbine wheel 120. The electrical power generated by the rotation of the magnet 150 within the stator 162 can be transmitted to a generator electronics package arranged outside of the body casing 107. In some embodiments, the electrical power from the stator 162 can be directed to one or more electrical connectors 167 for transmission to the electronics package, which then configures the electrical power to selected settings. The power output can be configured to provide useable electrical power, including either AC or DC power output at a variety of voltages. In one example, the generator electronics package may be used to output a 3-phase 60 Hz power output at a voltage of about 400 VAC to about 480 VAC, preferably about 460VAC. In a second example, the generator electronics package may be used to output a DC voltage of about 12 V to about 270 V, including selected outputs of 12 V, 125 V, 250 V, and 270 V. In alternative embodiments, the electrical power output may be selected at other settings, including other phases, frequencies, and voltages. Furthermore, the turbine generator apparatus 100 can be used to generate power in a "stand alone" system in which the electrical power is generated for use in an isolated network (e.g., to power an isolated machine or facility) or in a "grid tie" system in which the power output is linked or synchronized with a power grid network (e.g., to transfer the generated electrical power to the power grid).

The turbine generator apparatus 100 may include a number of longitudinally extending fins 170. The fins 170 may support the stator 162 in relation to the rotor 140 and direct the working fluid axially through the body casing 107. For example, the working fluid can exit to the outlet side 125 of the turbine wheel 120 and be directed by a contoured surface 142 of the rotor 140 toward the longitudinal fins 170. In some circumstances, the longitudinal fins 170 may serve as cooling fins that shunt at least a portion of the heat byproduct from the stator 162 to the longitudinal fins 170 for subsequent heat dissipation by the fluid flow. As the working fluid flows along the longitudinal fins 170, the working fluid passes along components of the electrical generator device 160 so as to dissipate heat therefrom. In this embodiment, the working fluid is directed to flow over the stator 162, as well as, between the stator 162 and rotor 140. The electrical generator device 160 may include a number of electronic components (including the stator 162) that produce significant heat during operation, so dissipation of such heat can reduce the likelihood of component failure. As shown in FIGS. 8-9, because the permanent magnet 150 and the electrical generator device 160 are arranged on the outlet side 125 of the turbine wheel 120, the working fluid that exits the turbine wheel 120 can be used to cool the components of the electrical generator device 160, thereby reducing the need for an external cooling system for the electrical generator device 160.

Figure 10:
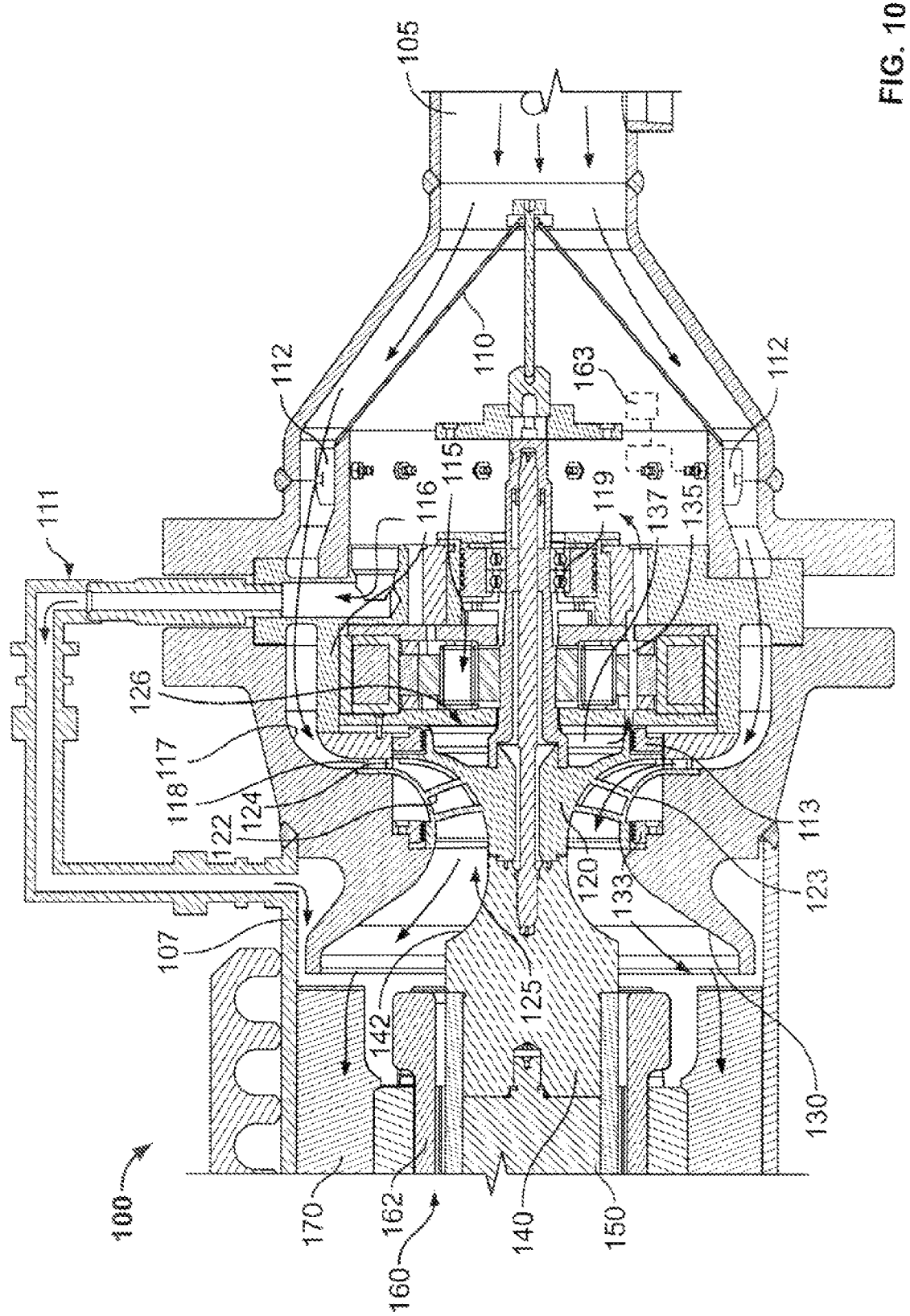
FIG. 10 is a cross-section view of a portion of the turbine generator apparatus of FIG. 8.

Referring now to the turbine generator apparatus 100 in more detail as shown in FIG. 10, the inlet conduit 105 can be a tubular structure that receives the heated and pressurized working fluid and directs the working fluid toward the input side 126 of the turbine wheel 120. The inlet conduit 105 can be mounted to the body casing 107 using a number fasteners that extend through adjacent flange portions. As such, the inlet conduit 105 can be removed from the body casing 107 so as to access the components on the input side 126 of the turbine wheel 120. For example, the inlet conduit 105 can be removed to provide service access to components such as a flow diverter cone 110, the first bearing support 115, and the first backup bearing support 119 that are disposed on the input side 126 of the turbine wheel 120. As described below, such access can be achieved without necessarily removing the turbine wheel 120 from the turbine apparatus 100.

The flow diverter cone 110 is arranged to extend into a portion of the inlet conduit 105 so as to direct the working fluid toward the turbine wheel inlet 124 disposed near the input side 126 of the turbine wheel 120. The flow diverter cone 110 may include a number of pre-swirl vanes 112 that impose a circumferential flow component to the inlet fluid flow. As such, when the working fluid flows into the turbine wheel inlet 124, the flow may have a circumferential swirl component that is at least partially similar to the rotational direction of the turbine wheel 120. In some embodiments, the pre-swirl vanes 112 may be fixedly mounted to the flow diverter cone 110 at a predetermined angle so as to provide the desired tangential flow component. Alternatively, the pre-swirl vanes 112 can be adjustably mounted to the flow diverter cone 110 so that the angle of the vanes 112 can be adjusted (e.g., by movement of an actuator 163, such as a hydraulic or electrical actuator coupled to the vanes 112) to vary the pre-swirl angle of all vanes 112 in unison according to varying fluid flow conditions. In certain embodiments, the flow diverter cone 110 can house elements of the system, for example, one or more actuators 163 and other components. Although the pre-swirl vanes 112 are depicted as being mounted to the diverter cone 110 in this embodiment, the pre-swirl vanes 112 can be fixedly mounted or adjustably mounted to the inlet conduit 105 near an inducer channel 117 to provide the desired tangential flow of the working fluid.

Still referring to FIG. 10, the working fluid flows from the pre-swirl vanes 112 and into the inducer channel 117 that directs the working fluid toward the turbine wheel inlet 124. In this embodiment, the turbine wheel inlet 124 is a radial inflow inlet disposed near the input side 126 of the turbine wheel 120. As such, the inducer channel 117 may direct the working fluid to flow radially toward the turbine wheel inlet 124 (with the tangential flow component imposed by the pre-swirl vanes 112). The working fluid may pass through an inlet nozzle device 118 that borders the periphery of the turbine wheel inlet 124. The inlet nozzle device 118 may have adjustable inlet nozzle geometry in which the inlet nozzle can be adjusted by one or more actuators. As previously described, the flow diverter cone 110 can be accessed for service or maintenance by removing the inlet conduit 105 (without necessarily removing the turbine wheel 120). Similarly, the inlet nozzle device 118 can be accessed for service or maintenance by removing the inlet conduit 105 and the first frame structure 116 (again, without necessarily removing the turbine wheel 120).

When the working fluid flows into the turbine wheel inlet 124, the working fluid acts upon the turbine blades 122 so as to impose a rotational force upon the turbine wheel 120. In particular, the turbine wheel 120 that rotates about the wheel axis as the working fluid expands and flows toward the outlet side 125 of the turbine wheel 120. For example, in some embodiments that employ an engineered fluid for use in an organic Rankine cycle, the working fluid may be pressurized and heated (in this example, to a temperature of about 230° F.) as it enters the inlet conduit 105 and thereafter may expand as it flows over the turbine wheel 120 and exits to the outlet side 125 (in this example, at a temperature of about 120° F.). In alternative embodiments, the temperatures of the working fluid in the pressurized and heated state and the expanded state may be different from the previous example. In particular, the working fluid temperatures in the pressurized and heated state and in the expanded state may be selected based on a number of factors, such as the specific application in which the turbine generator apparatus 100 is used, the properties of the working fluid, and the like. At least a portion of the energy released from the expansion of the working fluid can be converted into kinetic energy in the form of rotation of the turbine wheel 120. As previously described, in this embodiment, the turbine wheel 120 is a shrouded turbine wheel that includes a number of turbine blades 122 that translate the force from the working fluid acting against the blades 122 into the rotational motion of the turbine wheel 120. The turbine blades 122 can extended from the contoured hub of the turbine wheel 120 to the wheel shroud 123 and may be angled or contoured so as to impose a rotational force on the turbine wheel 120 as the working fluid acts against the blades 122.

Still referring to FIG. 10, the working fluid can flow through the turbine wheel inlet 124 located proximate to the input side 126 of the turbine wheel, act upon the turbine blades 122, and exit to the outlet side 125 of the turbine wheel 120 (e.g., the region extending from proximate the outlet face of the turbine wheel 120 and toward the outlet conduit 109). The turbine wheel 120 can be arranged in the turbine generator apparatus 100 so that the driven member 150 is on the outlet side 125 of the turbine wheel 120 (rather than on the input side 126 of the turbine wheel 120). In such embodiments, the outlet flow of working fluid to the outlet side 125 of the turbine wheel 120 is directed toward the rotor 140 and the driven member 150. Such an arrangement of the turbine wheel 120 and the driven member 150 may provide a number of features that are useful in the construction, operation, and maintenance of the turbine generator apparatus 100.

For example, in some embodiments, the arrangement of the turbine wheel 120 permits the turbine wheel 120 to be supported by bearing supports both the input side 126 and the outlet side 125 (e.g., including the region extending toward the outlet conduit 109). As previously described, the turbine wheel 120 can be rotationally supported by the first bearing support 115 (FIG. 10 and FIG. 9) and the second bearing support 145 (FIG. 9). The first bearing support 115 is arranged on the input side 126 of the turbine wheel 120 so as to support the turbine wheel 120 relative to the first frame structure 116 and the body casing 107 of the turbine generator apparatus 100. As such, the turbine wheel 120 can rotate about the axis of the first bearing support 115. In this embodiment, the turbine wheel 120 is not necessarily overhung from the first bearing support 115 in a cantilever fashion (e.g., with no bearing support on the one of the turbine wheel). Rather, in this embodiment, the second bearing support 145 (FIG. 2) is arranged on the outlet side 125 of the turbine wheel 120 (here, residing at an end of the rotor 140 opposite the turbine wheel 120 and within the region extending toward the outlet conduit 109) so as to support the turbine wheel 120 relative to the second frame structure 146 and the body casing 107 of the turbine generator apparatus 100. Accordingly, the turbine wheel 120 can be rotatably mounted between the first bearing support 115 on the input side 126 and the second bearing support 145 on the outlet side 125 of the turbine wheel 120. In such circumstances, the turbine wheel 120 (and the rotor 140 in this embodiment) can be supported in a non-cantilevered fashion.

Such a configuration of the bearing supports 115 and 145 on both the input side 126 and the outlet side 125 of the turbine wheel can provide an environment that is favorable to rotordynamic operation and lubrication. For example, employing bearing supports on opposing sides of the turbine wheel 120 may provide more uniform lubrication and load distribution along the rotational interfaces of the bearing supports (as compared to an overhung turbine wheel that is cantilevered from a bearing support). In addition, such a configuration can improve temperature control of the rotational interfaces. Further, the arrangement of the turbine wheel 120 in the turbine generator apparatus 100 can reduce the time and disassembly operations normally required for inspection and service of the bearing supports. For example, the bearing supports 115 and 145 can be accessed for inspection and servicing without necessarily removing the turbine wheel 120 from the turbine apparatus 100. As shown in FIG. 10, the first bearing support 115 (and, in this embodiment, the first backup bearing support 119) can be readily accessed by removing the inlet conduit 105 and the flow diverter cone 110 while the turbine wheel 120 remains generally in place. Because the inlet conduit 105 and flow diverter cone 110 can be comparatively smaller and lighter weight than conventional cast scrolls, it is easier to access the turbine wheel 120 and first bearing supports 115. As shown in FIG. 9, the second bearing support 145 can be readily accessed by removing the outlet conduit 109 and a cap portion of the second frame structure 146 (again, while the turbine wheel 120 remains generally in place).

Still referring to FIG. 10, the arrangement of the turbine wheel 120 in the turbine generator apparatus 100 permits the fluid outflow to the outlet side 125 of the turbine wheel to be directed toward the stator 162, rotor 140, and/or other components. As such, the working fluid can be used as a heat dissipation flow after it has expanded (and thereby cooled). For example, the working fluid can dissipate heat from the electrical generator device 160, including the stator 162 and other components.

As shown in FIG. 10, the working fluid exits the turbine wheel 120 into an exhaust conduit 130, which includes a contoured surface to guide the expanded working fluid. The fluid flow that exits to the outlet side 125 of the turbine wheel 120 may be directed in a generally axial direction toward the rotor 140 and stator 162, which are arranged along the outlet side 125 of the turbine wheel 120. In some embodiments in which the stator 162 is to be cooled, at least a portion of the flow of the working fluid may continue in the generally axial direction so as to flow directly over the stator 162 (e.g., along the outside of the stator 162 and along the longitudinal fins 170). In some embodiments in which the rotor 140 is to be cooled, at least a portion of the flow of the working fluid may continue in the generally axial direction so as to flow between the rotor 140 and the stator 162. Accordingly, some or all of the working fluid can be directed to flow over and dissipate heat from components of the electrical generator device 160. The rotor 140 may include a contoured surface 142 that redirects some or all of the fluid flow at least partially in a radial direction toward the longitudinal fins 170, which then guide the working fluid at least partially in an axial direction. Thus, some or all of the working fluid can be directed by the contoured surface 142 and the exhaust conduit 130 so as to flow over particular components of the electrical generator device 160.

Such an arrangement of the driven member 150 on the outlet side 125 of the turbine wheel 120 facilitates the use of the expanded working fluid as a heat dissipation medium. In some circumstances, the heat dissipation flow provided by the expanded working fluid may reduce or eliminate the need for an external cooling system for the rotor 140 and/or stator 162 (and other components of the electrical generator device 160). For example, the expanded working fluid may flow along the longitudinal fins 170 at a rate so as to cool the stator 162 without employing an external cooling system to remove heat from the stator 162.

Still referring to FIG. 10, the arrangement of the turbine wheel 120 in the turbine generator apparatus 100 provides for the use of seals 113 and 133, which can serve to inhibit leakage of the working fluid out of the flow path. In addition, the arrangement of the turbine wheel 120 permits the seals 113 and 133 to be readily accessed for inspection and service. As shown in FIG. 10, the first seal 113 can be disposed on the input side 126 along an outer annular surface of the turbine wheel 120. The first seal 113 can inhibit leakage of working fluid passing from the nozzle device 118 to a reaction pressure reservoir 137, and such leakage reduction can be used to direct the working fluid to the wheel inlet 124. The second seal 133 can be disposed near the outlet side 125 of the turbine wheel along an outer annular surface of the wheel shroud 123. The second seal 133 can inhibit leakage of working fluid passing from the nozzle device 118 to the exhaust conduit 130, and such leakage reduction can be used to reduce the likelihood of the working fluid bypassing the wheel inlet 124. One or both of the first and second seals 113 and 133 can be continuous-ring seals that are unitary and circumscribe the turbine wheel 120. One or both may additionally, or alternatively, be labyrinth seals and may comprise a polymer material. In this embodiment, the first and second seals 113 and 133 have identical configurations.

In certain embodiments, the turbine wheel 120 can be pressure balanced. For example, when the working fluid exits to the outlet side 125 of the turbine wheel 120, a low pressure region may be created near the turbine wheel outlet, which creates a thrust force is in the axial direction toward the outlet side 125. To counter this low pressure region and the resulting thrust force, the reaction pressure reservoir 137 is arranged on the input side 126 of the turbine wheel 120. The reaction pressure reservoir 137 may be in fluid communication with the exhaust conduit 130 so as to substantially equalize the pressure regions on both sides of the turbine wheel 120, thereby providing a thrust balance arrangement for the turbine wheel 120.

For example, as the turbine wheel 120 operates, a small amount of working fluid may seep into the reaction pressure reservoir 137 (e.g., some fluid may seep along the dynamic seal surface of the first seal 113). As shown in FIG. 10, in response to lower pressure near the turbine wheel outlet, the pressure in the reservoir 137 may be reduced by directing the working fluid in the reaction pressure reservoir 137 into a first channel 135 to a region on the interior of the flow diverter cone 110. This region is in fluid communication with a second conduit 111 (e.g., shown as an external piping arrangement) that extends toward the exhaust conduit 130. Accordingly, the fluid pressure in the reaction pressure reservoir 137 may be equalized with the fluid pressure near the turbine wheel outlet in the exhaust conduit 130, thereby neutralizing the thrust force that may other occur if the pressure on near the turbine wheel outlet was substantially different from the pressure in the reservoir 137. Such a balancing of the thrust load imposed upon the turbine wheel 120 may permit a substantial increase the permissible pressure drop across the turbine wheel 120, which can thereby increase the maximum kinetic energy generated by the rotation of the turbine wheel 120.

It should be understood that, in other embodiments, the reaction pressure reservoir 137 may be in fluid communication with the exhaust conduit 130 via internal channels through the first frame member 116 and the exhaust conduit (rather than using the external piping of the second conduit 111). For example, the first channel 135 may be in fluid communication with a second channel bored partially through the first frame structure 116 and partially through the wall of the exhaust conduit 130. In such circumstances, the reaction pressure reservoir 137 can be in fluid communication with the exhaust conduit 130 so as to substantially equalize the pressure regions on both sides of the turbine wheel 120.

Still referring to FIG. 10, the arrangement of the turbine wheel 120 in the turbine generator apparatus 100 can reduce the likelihood of leakage to or from the external environment. For example, because the flow from the outlet of the turbine wheel 120 is maintained within the turbine generator apparatus 100 rather than being exhausted outside of the system, the housing of the turbine generator apparatus 100 (including body casing 107) can be more readily hermetically sealed from the inlet conduit 105 to the outlet conduit 109. Moreover, seepage of working fluid to the input side 126 of the turbine wheel 120 can simply reenter the working fluid flow path rather than leaking into the environment. For example, in the embodiment depicted in FIG. 10, the working fluid flows through the inlet nozzle 118 to the turbine wheel 120. As such, any leakage of the working fluid toward the input side 126 of the turbine wheel 120 would merely migrate into the reservoir 137. The fluid that seeps into the reservoir 137 can readily reenter into the working fluid flow path via the first and second conduits 135 and 111 (returning to the flow path near the exhaust conduit 130). In such circumstances, the working fluid that was leaked to the input side 126 of the turbine wheel 120 can reenter the flow of the working fluid without seeping into the external environment (e.g., outside the inlet conduit 105, the body casing 107, or flow path piping).

Thus, such an arrangement of the turbine wheel 120 can provide a hermetically sealed turbine generator apparatus 100. Some embodiments of the hermetically sealed turbine generator apparatus 100 may be useful, for example, when the working fluid is a regulated or hazardous fluid that should not be released into the external environment. In some circumstances, the regulated or hazardous fluids may include engineered fluids that are used in a number of organic Rankine cycles. For example, certain embodiments may use GENETRON 245fa, a product of Honeywell International, Inc., as a working fluid. In alternative embodiments, the working fluid may comprise other engineered materials. Accordingly, the turbine generator apparatus 100 can be employed in an organic Rankine cycle so as to reduce the likelihood of leaking the working fluid into the surrounding environment.

Figure 11:
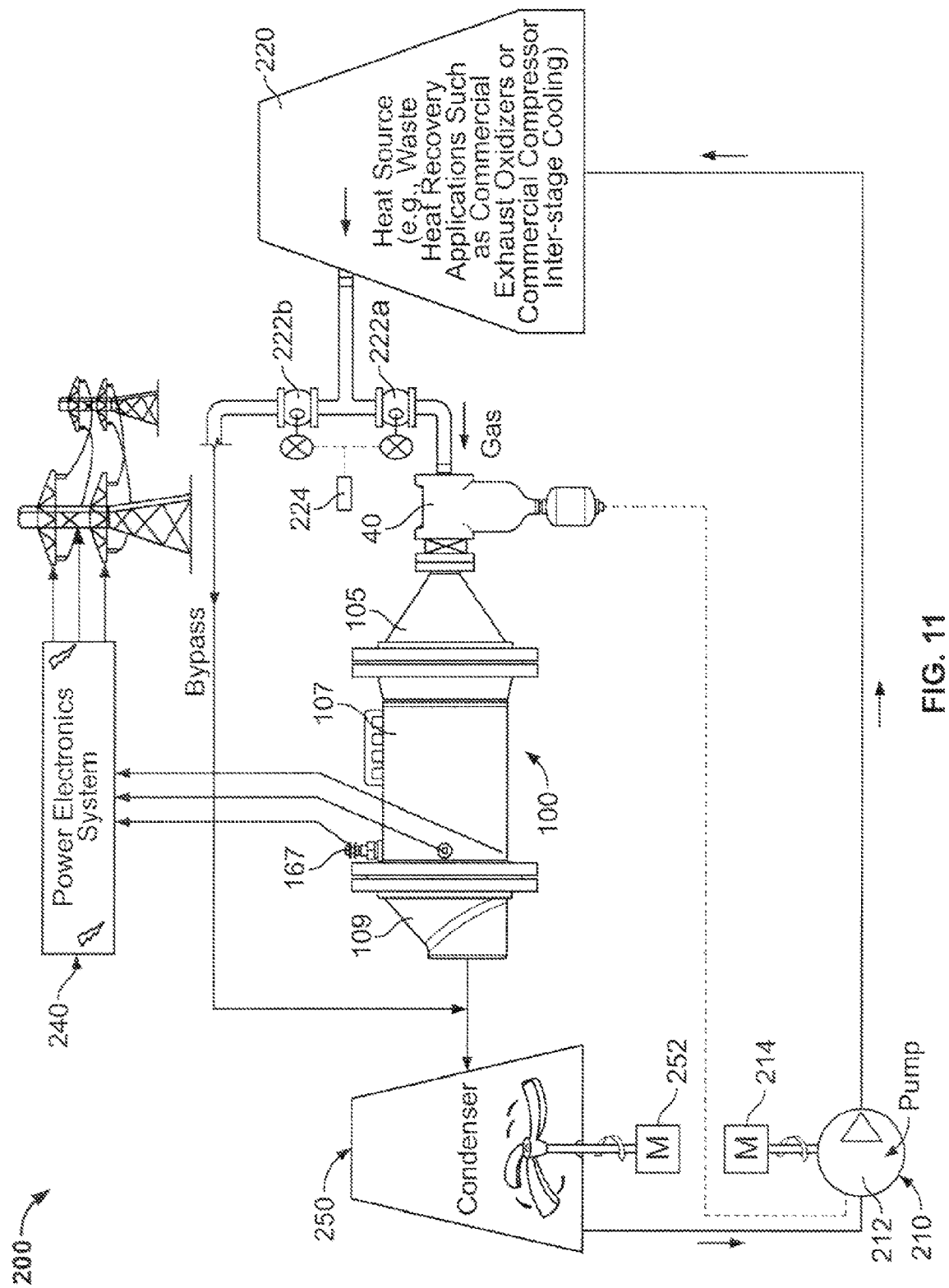
FIG. 11 is a diagram of a turbine generator apparatus used in a fluid expansion system to generate electrical power, in accordance with some embodiments.

Referring now to FIG. 11, some embodiments of the turbine generator apparatus 100 can be used in a Rankine cycle 200 that recovers waste heat from one or more industrial processes. For example, as previously described, the Rankine cycle 200 may comprise an organic Rankine cycle that employs an engineered working fluid to receive heat from an industrial application including, but not limited to, commercial exhaust oxidizers (e.g., a fan-induced draft heat source bypass system, a boiler system, or the like), refinery systems that produce heat, foundry systems, smelter systems, landfill flare gas and generator exhaust, commercial compressor systems, food bakeries, and food or beverage production systems. As such, the turbine generator apparatus 100 can be used to recover waste heat from industrial applications and then to convert the recovered waste heat into electrical energy. Furthermore, the heat energy can be recovered from geothermal heat sources and solar heat sources. In some circumstances, the working fluid in such a Rankine cycle 200 may comprise a high molecular mass organic fluid that is selected to efficiently receive heat from relatively low temperature heat sources. Although the turbine generator apparatus 100 and other components are depicted in the Rankine cycle 200, it should be understood from the description herein that some components that control or direct fluid flow are excluded from view in FIG. 11 for illustrative purposes.

As previously described, in particular embodiments, the turbine generator apparatus 100 can be used to convert heat energy from a heat source into kinetic energy (e.g., rotation of the rotor 140), which is then converted into electrical energy. For example, the turbine generator apparatus 100 may output electrical power that is configured by an electronics package to be in form of 3-phase 60 Hz power at a voltage of about 400 VAC to about 480 VAC. As previously described, alternative embodiments may out electrical power having other selected settings. In some embodiments, the turbine generator apparatus 100 may be configured to provide an electrical power output of about 2 MW or less, about 50 kW to about 1 MW, and about 100 kW to about 300 kW, depending upon the heat source in the cycle and other such factors. Again, alternative embodiments may provide electrical power at other Wattage outputs. Such electrical power can be transferred to a power electronics system and, in some embodiments, to an electrical power grid system. Alternatively, the electrical power output by the turbine generator apparatus 100 can be supplied directly to an electrically powered facility or machine.

Similar to previously described embodiments, the Rankine cycle 200 may include a pump device 210 that pressurizes the working fluid. The pump device 210 may be coupled to a reservoir 212 that contains the working fluid, and a pump motor 214 can be used to pressurize the working fluid. The pump device 210 may be used to convey the working fluid to a heat source 220 of the Rankine cycle 200. As shown in FIG. 11, the heat source 220 may include heat that is recovered from an existing process (e.g., an industrial process in which heat is byproduct). Examples of such an industrial process include commercial exhaust oxidizers (e.g., a fan-induced draft heat source bypass system, a boiler system, or the like) or commercial compressor systems (e.g., commercial compressor interstage cooling). In such circumstances, the working fluid may be directly heated by the existing process or may be heated in a heat exchanger in which the working fluid receives heat from a byproduct fluid of the existing process. In this embodiment, the working fluid can cycle through the heat source 220 so that a substantial portion of the fluid is converted into gaseous state. Accordingly, the working fluid is pressurized by the pump device 210 and then heated by the heat source 220.

Still referring to FIG. 11, the pressurized and heated working fluid may pass from the heat source 220 to the turbine generator apparatus 100. Similar to previously described embodiments, dual control valves 222a-b may be employed to control the flow of the working fluid to the turbine generator apparatus 100 (or to bypass the turbine generator apparatus 100). For example, the first valve 222a may be fully open while the second valve 22b is fully closed, or vice versa. As previously described in connection with FIGS. 7A-B, the first and second control valves 222a-b may be mechanically coupled to one another so as to operate in unison. As such, an actuator device 224 may be activated by a user or by a computer control system to contemporaneously adjust the first valve 222a and the second valve 222b between the respective opened and closed positions.

When the first control valve 222a is opened, the heated and pressurized working fluid may be directed to the liquid separator 40 (FIGS. 1 and 4A). As previously described, the liquid separator 40 may be arranged upstream of the turbine generator apparatus 100 so as to separate and remove a substantial portion of any liquid state droplets or slugs of working fluid that might otherwise pass into the turbine generator apparatus 100. Accordingly, the gaseous state working fluid can be passed to the turbine generator apparatus 100 while a substantial portion of any liquid-state droplets or slugs are removed and returned to the reservoir 212.

After passing through the liquid separator 40, the heated and pressurized working fluid may pass through the inlet conduit 105 and toward the turbine wheel 120 (FIG. 8). As previously described in connection with FIGS. 8-10, the working fluid expands as it flows across the turbine wheel 120 and into the body casing 107, thereby acting upon the turbine wheel 120 and causing rotation of the turbine wheel 120. Accordingly, the turbine generator apparatus 100 can be included in a fluid expansion system in which kinetic energy is generated from expansion of the working fluid. The rotation of the turbine wheel 120 is translated to the rotor 140, which in this embodiment includes the magnet 150 that rotates within an electrical generator device 160 (FIGS. 8-10). As such, the kinetic energy of the turbine wheel 120 is used to generate electrical energy. As previously described, the electrical energy output from the electrical generator device 160 can be transmitted via one or more connectors 167 (e.g., three connectors 167 are employed in this embodiment).

Still referring to FIG. 11, in some embodiments, the electrical energy can be communicated via the connectors 167 to a power electronics system 240 that is capable of modifying and storing the electrical energy. In one example, the power electronics system 240 may be similar to power substation that is connected to an electrical power grid system. As previously described, in some embodiments, the turbine generator apparatus 100 may be configured to provide an electrical power output of about 2 MW or less, about 50 kW to about 1 MW, and about 100 kW to about 300 kW, depending upon the heat source 220, the expansion capabilities of the working fluid, and other such factors. As an alternative to the embodiment depicted in FIG. 11, the electrical energy output by the turbine generator apparatus 100 can be supplied directly to an electrically powered facility or machine.

In some embodiments of the Rankine cycle 200, the working fluid may flow from the outlet conduit 109 of the turbine generator apparatus 100 to a condenser 250. The condenser 250 may include a motor 252 that is used to remove excess heat from the working fluid so that a substantial portion of the working fluid is converted to a liquid state. For example, the motor 252 may be used to force cooling airflow over the working fluid. In another example, the motor 252 may be used to force a cooling fluid to flow in a heat exchange process with the working fluid. After the working fluid exits the condenser 250, the fluid may return to the reservoir 212 where it is prepared to flow again though the cycle 200.

Figure 12:
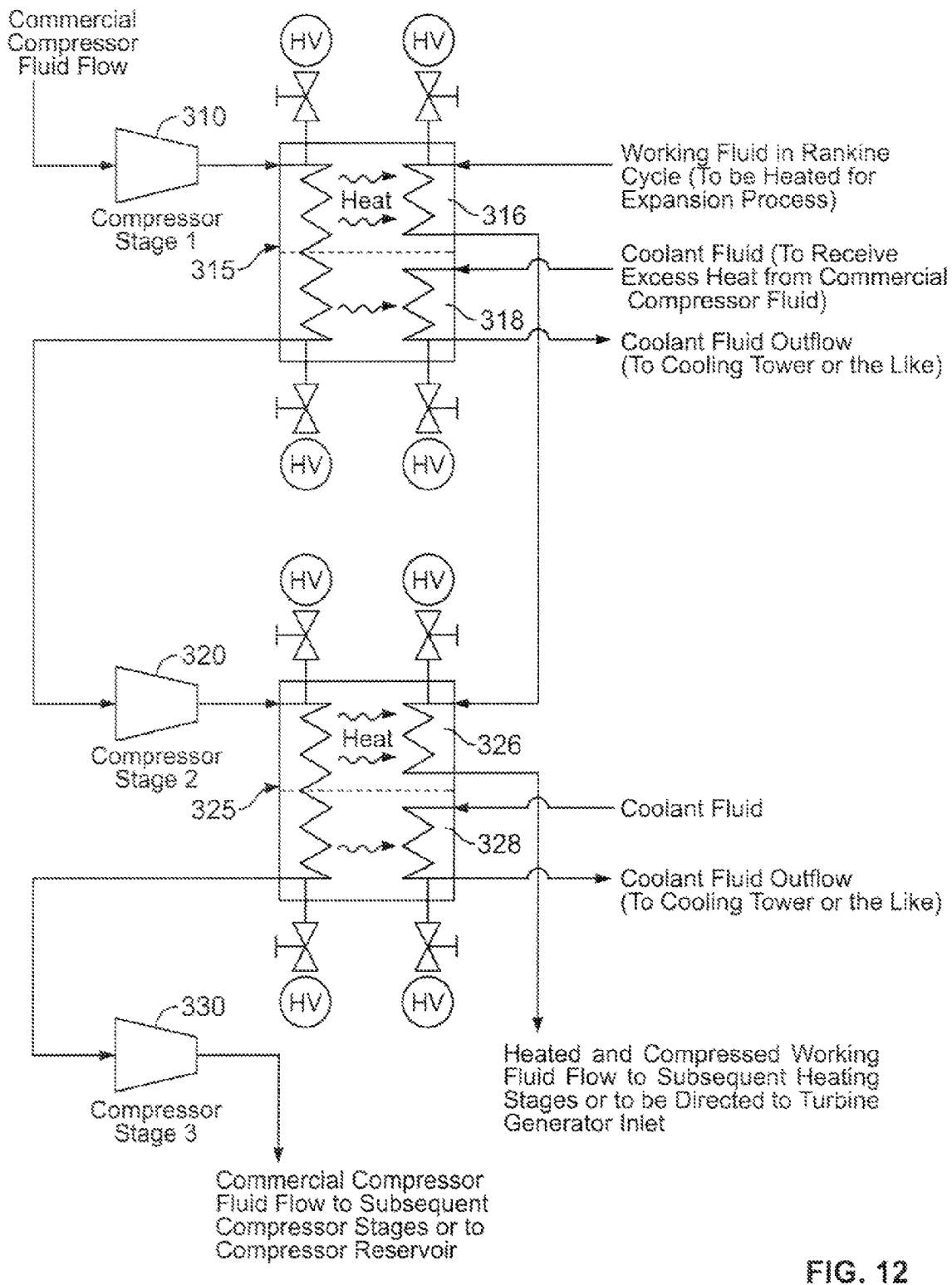
FIG. 12 is a diagram of a heat source for a working fluid in a Rankine cycle, in accordance with some embodiments.

Referring to FIG. 12, in one example, the working fluid that passes through the turbine generator apparatus 100 may recover waste heat from a commercial compressor interstage cooling process. A commercial compressor process may employ interstage cooling in which the compressor fluid is cooled in a heat exchanger between one or more of the compression stages. In such circumstances, the commercial compressor interstage cooling may serve as the heat source 60 (FIG. 4A) or 220 (FIG. 11) for the working fluid in the Rankine cycle.

In this embodiment, the commercial compressor may include a plurality of compressor stages 310, 320 and 330. A first heat exchanger 315 may be arranged between the first and second compressor stages 310 and 320 so as to remove heat from the compressor fluid. The working fluid of the Rankine cycle passes through a first section 316 of the heat exchanger 315 to receive a portion of the heat dissipated from the compressor fluid flow. In some circumstances, the compressor fluid may require further cooling, so a coolant fluid may pass through a second section 318 of the heat exchanger 315 to further dissipate any excess heat from the compressor fluid. After removing the excess heat from the compressor fluid, the coolant fluid may be directed to a cooling tower or the like. As shown in FIG. 12, the first section 316 and the second section 318 may be isolated from one another so that the working fluid of the Rankine cycle receives the heat from the compressor fluid as it initially exits from the first compressor stage 310. The first and second sections 316 and 318 of the heat exchanger 315 can be independently controlled. As such, the flow of the coolant fluid through the second section 318 can be adjusted to increase or decrease the overall amount of heat that is removed from the compressor fluid, thereby providing fine tuned control of the compressor fluid temperature while enabling the working fluid of the Rankine cycle to receive a substantial amount of heat.

Still referring to FIG. 12, the working fluid that is heated in the first heat exchanger 315 may be directed to a second heat exchanger 325 arranged between the second compressor stage 320 and the third compressor stage 330. Similar to the first heat exchanger 315, the second heat exchanger 325 may be subdivided into two sections 326 and 328. The working fluid of the Rankine cycle passes through the first section 326 of the heat exchanger 325 to receive a portion of the heat dissipated from the compressor fluid flow after the second compressor stage 320. The coolant fluid may pass through a second section 318 of the heat exchanger 325 to further dissipate any excess heat from the compressor fluid. Again, after receiving any excess heat from the compressor fluid after the second compressor stage 320, the coolant fluid may be directed to a cooling tower or the like. Similar to the previously described heat exchange 315, the first section 326 and the second section 328 of the second heat exchanger 325 may be isolated from one another so that the working fluid of the Rankine cycle receives the heat from the compressor fluid as it initially exits from the second compressor stage 320.

Accordingly, the working fluid of the Rankine cycle can be incrementally heated by a series of heat exchangers 315 and 325 arranged after the compressor stages 310 and 320 of a commercial compressor interstage cooling process. Such a process permits the waste heat from an industrial process to be recovered and converted into electrical energy (e.g., by expansion of the working fluid in the turbine generator apparatus 100). In some circumstances, the electrical energy generated by the turbine generator apparatus 100 can be used to at least partially power the industrial process that generates the heat (e.g., the electrical power can be used to at least partially power the commercial compressor system). Moreover, in alternative embodiments, the kinetic energy from the rotation of the turbine wheel 120 in the turbine generator apparatus 100 can be used to mechanically power the commercial compressor system. For example, the turbine wheel 120 in the turbine generator apparatus 100 can be coupled to at least one of the compressor high-speed shafts to augment the power required to rotate the compressor high-speed shaft (e.g., in a multi-stage turbo compressor application). Although the plurality of compressor stages 310, 320 and 330 can be used to heat the working fluid in the Rankine cycle, it should be understood that (in other embodiments) only one of the compressor stages (e.g., stage 310) may be used as the heat source for the working fluid.

The embodiments described in connection with FIG. 12 include the commercial compressor interstage cooling process operating as the heat source 60 (FIG. 4A) or 220 (FIG. 11) for the working fluid in the Rankine cycle. It should be understood that, in some embodiments, the Rankine cycle described in connection with FIG. 12 may employ a fluid expansion system other than the previously illustrated fluid expansion system 10.

Figure 13:
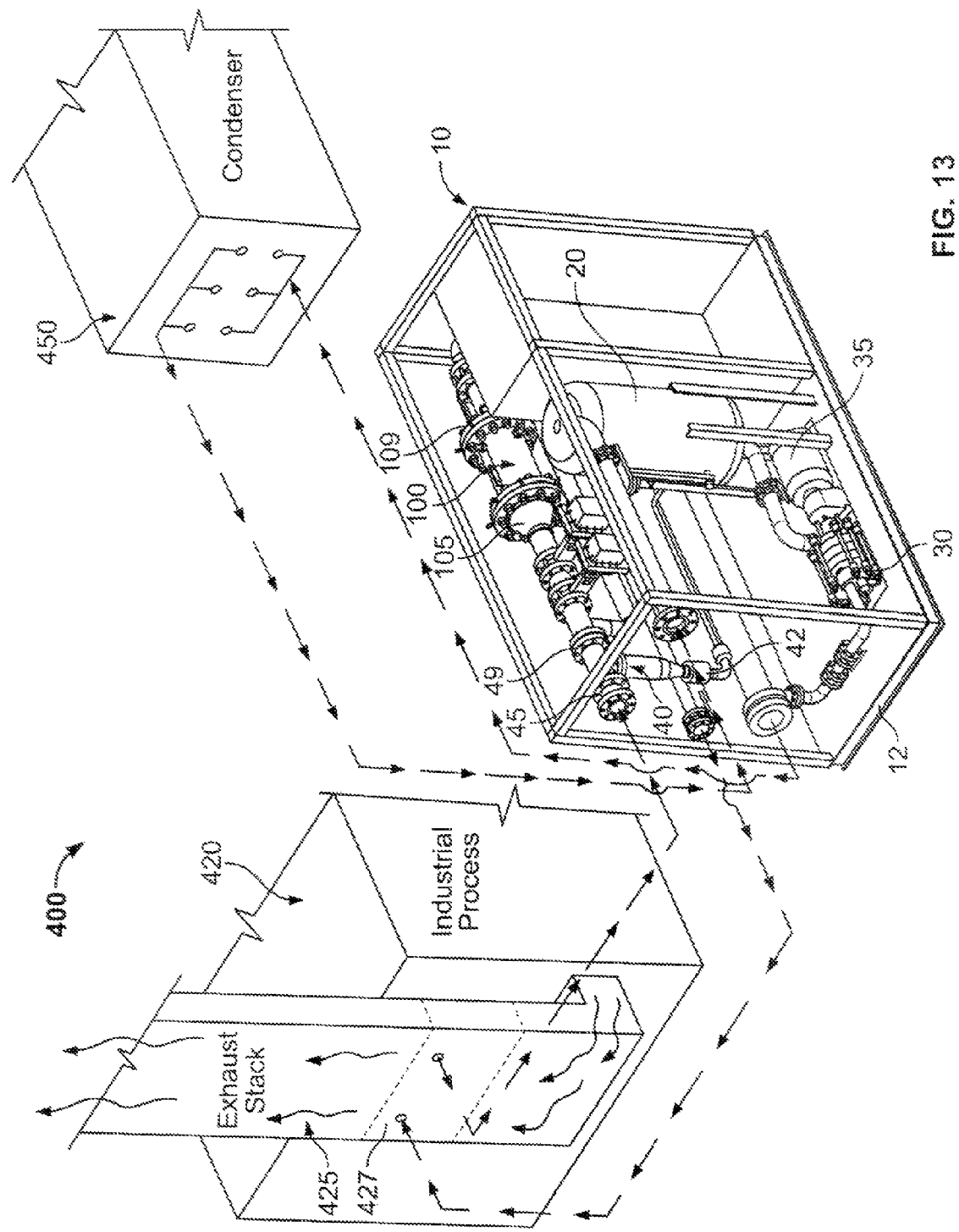
FIG. 13 is a perspective view of fluid cycle to generate electrical energy using a turbine generator apparatus, in accordance with some embodiments.

Referring to FIG. 13, in another example, the working fluid that passes through the turbine generator apparatus 100 may recover waste heat from an industrial process 420, such as a commercial exhaust oxidizer, in which heat is byproduct. Accordingly, the working fluid is pressurized by the pump device 30 and then heated in a heat exchange process with the high-temperature exhaust fluid of the industrial process 420 before passing to the turbine generator apparatus 100.

In this embodiment, the Rankine cycle 400 includes the fluid expansion system 10, the industrial process 420 in which heat is byproduct (e.g., commercial exhaust oxidizer to the like), and a condenser 450 (e.g., an evaporative condenser or the like). The industrial process 430 may include an exhaust stack 425 through which a heated exhaust fluid is expelled. The heated exhaust fluid may be a byproduct of the industrial process 420. For example, in some oxidizer systems, the exhaust fluid may pass into the exhaust stack 425 at a temperature of about 200° F. or more, about 250° F. or more, about 300° F. to about 800° F., about 350° F. to about 600° F., and in some embodiments at about 400° F. Rather than allowing the heated exhaust fluid to be fully dissipated to the environment without recovering the heat energy, the Rankine cycle 400 may incorporate the fluid expansion system 10 to recover at least a portion of the heat energy and generate electrical power therefrom. For example, the working fluid that passes that passes through the turbine generator apparatus 100 may be heated in a heat exchanger 427 arranged proximate to the exhaust stack 425 of the industrial process 420. Thus, the exhaust stack 425 of the industrial process 420 may serve as an evaporator or other heat source that transfers heat energy to the working fluid before the working fluid passes through the turbine generator apparatus 100. In this embodiment, the heat exchanger 427 is disposed in the exhaust stack 427 so as to recover at least a portion of the heat energy from the exhaust fluid and to transfer that heat energy to the working fluid of the Rankine cycle 400.

Still referring to FIG. 13, the working fluid that is heated in the heat exchanger 427 may be directed to the fluid expansion system 10 for passage through the liquid separator 40 and the turbine generator apparatus 100. As previously described in connection with FIGS. 8-10, the turbine generator apparatus 100 can be used to generate electrical energy from the heated and pressurized working fluid. Accordingly, the working fluid of the Rankine cycle 400 can be heated by at least one heat exchanger 427 arranged at the exhaust stack 425 of the industrial process 420 (e.g., a commercial exhaust oxidizer process). Such a cycle permits the waste heat from an industrial process 420 to be recovered and converted into electrical energy by expansion of the working fluid in the turbine generator apparatus 100. In some circumstances, the electrical energy generated by the turbine generator apparatus 100 can be used to at least partially power the industrial process that generates the heat (e.g., the electrical power can be used to at least partially power the oxidizer system).

After the working fluid is expanded in the turbine generator apparatus 100, the working fluid may be directed to a condenser unit 450 of the Rankine cycle 400. The condenser unit 450 may comprise, for example, and evaporative condenser that outputs the working fluid in a cooled state (e.g., in a liquid state). The expanded and cooled working fluid is then directed to the reservoir 20 of the fluid expansion system 10 where it awaits passage through the pump 30 and to the heat exchange process. This fluid cycle can be repeated so as to recover the waste heat from the industrial process 420 and thereafter convert the heat energy into electrical energy (e.g., by expansion of the working fluid in the turbine generator apparatus 100).

The embodiments described in connection with FIG. 13 include the commercial exhaust oxidizer operating as the heat source 60 (FIG. 4A) or 220 (FIG. 11) for the working fluid in the Rankine cycle. It should be understood that, in some embodiments, the Rankine cycle described in connection with FIG. 13 may employ a fluid expansion system other than the previously illustrated fluid expansion system 10

A number of embodiments of the invention have been described. Nevertheless, it will be understood that various modifications may be made without departing from the spirit and scope of the invention. Accordingly, other embodiments are within the scope of the following claims.

What is claimed is:

1. A method of using a turbine generator system, comprising:
   pumping a working fluid in a Rankine cycle from a low pressure reservoir toward at least one compressor interstage cooler;
   heating the working fluid from heat energy recovered from one or more compression stages of the compressor interstage cooler, at least a portion of the working fluid being pressurized and heated to a gaseous state;
   directing the heated and pressurized working fluid toward a turbine generator apparatus, the turbine generator apparatus including an inlet conduit to direct the working fluid toward a turbine wheel that is rotatable in response to expansion of the working fluid; and
   generating electrical energy from the rotation of the turbine wheel, the turbine wheel being coupled to a rotor of an electrical energy generator that rotates within a stator of the electrical energy generator.

2. The method of claim 1, further comprising directing the working fluid toward one or more heat exchangers to heat the working fluid from the heat energy recovered from at least two compression stages of the compressor interstage cooler.

3. The method of claim 1, further comprising separating a liquid state portion of the heated and pressurized working fluid from a gaseous state portion of the heated and pressurized working fluid before the working fluid is delivered to the turbine generator apparatus.

4. The method of claim 3, wherein the liquid state portion is separated using a cyclone separator device, the cyclone separator device being arranged in the Rankine cycle upstream of the turbine generator apparatus.

5. The method of claim 1, wherein the rotor of the electrical energy generator is arranged on an outlet side of the turbine wheel.

6. The method of claim 5, further comprising cooling at least a portion of the electrical energy generator with the working fluid exiting to the outlet side of the turbine wheel.

7. The method of claim 1, wherein the Rankine cycle is an organic Rankine cycle, and the working fluid comprises high molecular mass organic fluid.

8. The method of claim 7, further comprising cycling the working fluid through the organic Rankine cycle while inhibiting seepage of the working fluid to an environment external to the organic Rankine cycle.

9. The method of claim 1, further comprising transporting a system package that houses the turbine generator apparatus, a liquid separator, a fluid pump device, and the low pressure reservoir for the working fluid, the system package having a width of less than about 50 inches and a height of less than about 80 inches so as to fit through a double-door passage.

10. The method claim of claim 9, wherein the system package has a width of about 48 inches or less and a height of about 78 inches or less.

11. The method of claim 1 wherein the compressor interstage cooler is part of a commercial compressor.

12. A method of using a turbine generator system, comprising:
   pumping a working fluid in a Rankine cycle from a low pressure reservoir toward at least one compressor interstage cooler;
   directing the working fluid toward one or more heat exchangers to heat the working fluid from heat energy recovered from at least two compression stages of the compressor interstage cooler;
   heating the working fluid from the heat energy recovered from the at least two compression stages of the compressor interstage cooler, at least a portion of the working fluid being pressurized and heated to a gaseous state;
   directing the heated and pressurized working fluid toward a turbine generator apparatus, the turbine generator apparatus including an inlet conduit to direct the working fluid toward a turbine wheel that is rotatable in response to expansion of the working fluid; and
   generating electrical energy from the rotation of the turbine wheel, the turbine wheel being coupled to a rotor of an electrical energy generator that rotates within a stator of the electrical energy generator.

13. A method of using a turbine generator system, comprising:
   cycling a high molecular mass, organic working fluid in an organic Rankine cycle from a low pressure reservoir toward at least one compressor interstage cooler, the working fluid cycled through the organic Rankine cycle while inhibiting seepage of the working fluid to an environment external to the organic Rankine cycle;
   heating the working fluid from heat energy recovered from one or more compression stages of the compressor interstage cooler, at least a portion of the working fluid being pressurized and heated to a gaseous state;
   directing the heated and pressurized working fluid toward a turbine generator apparatus, the turbine generator apparatus including an inlet conduit to direct the working fluid toward a turbine wheel that is rotatable in response to expansion of the working fluid; and
   generating electrical energy from the rotation of the turbine wheel, the turbine wheel being coupled to a rotor of an electrical energy generator that rotates within a stator of the electrical energy generator.

14. A Rankine cycle system, comprising:
   a pump device coupled to a low pressure reservoir and one or more heat exchangers to receive a working fluid in the Rankine cycle from the low pressure reservoir and to pump the working fluid toward the one or more heat exchangers;
   the one or more heat exchangers coupled to at least one interstage cooler to heat the working fluid from heat energy recovered from one or more compression stages of the compressor interstage cooler, at least a portion of the working fluid being pressurized and heated to a gaseous state; and
   a turbine generator apparatus coupled to the one or more heat exchangers for receiving heated and pressurized working fluid, the turbine generator apparatus comprising:
   a turbine wheel configured to receive the heated and pressurized working fluid and rotate in response to expansion of the working fluid flowing from an inlet side to an outlet side of the turbine wheel, and an electric generator having a stator and a rotor, the rotor coupled to the turbine wheel to rotate within the stator in response to rotation of the turbine wheel to generate electrical energy.

15. The system of claim 14 wherein the one or more heat exchangers is coupled to the at least one interstage cooler to heat the working fluid from heat energy recovered from at least two compression stages of the compressor interstage cooler.

16. The system of claim 14 further comprising a liquid separator configured to separate a liquid state portion of the heated and pressurized working fluid from a gaseous state portion of the heated and pressurized working fluid, the liquid separator arranged in the Rankine cycle upstream of the turbine generator apparatus.

17. The system of claim 16, wherein the liquid separator is a cyclone separator device, the cyclone separator device being arranged in the Rankine cycle upstream of the turbine generator apparatus.

18. The system of claim 14, wherein the rotor of the electrical energy generator is arranged on an outlet side of the turbine wheel.

19. The system of claim 18, wherein the electric generator is configured to receive working fluid exiting the outlet side of the turbine wheel, the electric generator configured to direct the working fluid between the rotor and the stator.

20. The system of claim 14, wherein the Rankine cycle is an organic Rankine cycle, and the working fluid comprises high molecular mass organic fluid.

21. The system of claim 20 further configured to prevent seepage of the working fluid to an environment external to the organic Rankine cycle.

22. The system of claim 14, further comprising a system package that houses the turbine generator apparatus, a liquid separator, the pump device, and the low pressure reservoir for the working fluid, the system package having a width of less than about 50 inches and a height of less than about 80 inches so as to fit through a double-door passage.

23. The system claim of claim 22, wherein the system package has a width of about 48 inches or less and a height of about 78 inches or less.

* * * * *